United States Patent
Lindner et al.

(10) Patent No.: US 11,346,416 B2
(45) Date of Patent: May 31, 2022

(54) BRAKE DISC INSERT WITH BRIDGE MEMBER

(71) Applicant: Honeywell International Inc., Morris Plains, NJ (US)

(72) Inventors: Mark Lindner, South Bend, IN (US); Anthony Scelsi, South Bend, IN (US); Jeffrey Eleff, South Bend, IN (US)

(73) Assignee: Honeywell International Inc., Charlotte, NC (US)

( * ) Notice: Subject to any disclaimer, the term of this patent is extended or adjusted under 35 U.S.C. 154(b) by 64 days.

(21) Appl. No.: 16/856,141

(22) Filed: Apr. 23, 2020

(65) Prior Publication Data
US 2021/0332865 A1    Oct. 28, 2021

(51) Int. Cl.
*F16D 65/12* (2006.01)
*B64C 25/44* (2006.01)
*F16D 55/36* (2006.01)
*F16D 65/02* (2006.01)

(52) U.S. Cl.
CPC ............ *F16D 65/123* (2013.01); *B64C 25/44* (2013.01); *F16D 55/36* (2013.01); *F16D 2065/1304* (2013.01); *F16D 2065/1364* (2013.01); *F16D 2200/0021* (2013.01); *F16D 2250/0084* (2013.01)

(58) Field of Classification Search
CPC .................. F16D 65/123–126; F16D 65/12
USPC ................................ 188/218 XL, 18 A, 71.5
See application file for complete search history.

(56) References Cited

U.S. PATENT DOCUMENTS

| | | | |
|---|---|---|---|
| 3,345,109 A | 10/1967 | Petersen et al. | |
| 3,605,967 A | 9/1971 | Warren et al. | |
| 4,155,432 A | 5/1979 | Krause | |
| 4,465,165 A * | 8/1984 | Bok | F16D 65/126 |
| | | | 188/218 XL |
| 4,511,021 A | 4/1985 | Grider | |

(Continued)

FOREIGN PATENT DOCUMENTS

| | | |
|---|---|---|
| DE | 10159799 A1 | 6/2003 |
| EP | 2000694 A1 | 12/2008 |

(Continued)

OTHER PUBLICATIONS

"Aircraft Wheels—Wheel Construction," Flight Mechanic, accessed from http://www.flight-mechanic.com/aircraft-wheels-wheel-construction/, accessed on Aug. 2, 2019, 6 pp.

(Continued)

*Primary Examiner* — Christopher P Schwartz
(74) *Attorney, Agent, or Firm* — Shumaker & Sieffert, P.A.

(57) ABSTRACT

In some examples, a drive insert for a drive slot of a brake disc includes a first insert member configured to cover a first surface of the drive slot, a second insert member configured to cover a second surface of the drive slot, and a bridge member configured to extend between the first insert member and the second insert member. The bridge member is configured to limit movement of the first insert member and the second insert member in a tangential direction of the brake disc when the bridge member extends from the first insert member to the second insert member. In some examples, the bridge member is configured to be in compression between the first insert member and the second insert member.

20 Claims, 11 Drawing Sheets

(56) References Cited

U.S. PATENT DOCUMENTS

| | | | | |
|---|---|---|---|---|
| 4,557,356 | A | * | 12/1985 | Petersen ............... F16D 65/126 188/218 XL |
| 4,742,948 | A | | 5/1988 | Fisher et al. |
| 4,784,246 | A | | 11/1988 | Edmisten |
| 4,863,001 | A | * | 9/1989 | Edmisten ............. F16D 65/126 188/218 XL |
| 4,865,160 | A | | 9/1989 | Casey |
| 5,273,140 | A | | 12/1993 | Berwanger |
| 6,365,882 | B1 | | 4/2002 | Stabile et al. |
| 6,635,355 | B2 | | 10/2003 | Bianco et al. |
| 6,843,350 | B2 | | 1/2005 | Larkin et al. |
| 7,410,036 | B2 | | 8/2008 | Wimmer et al. |
| 7,766,133 | B2 | * | 8/2010 | Cress ................... F16D 65/126 188/218 XL |
| 7,802,758 | B2 | | 9/2010 | Cress et al. |
| 9,897,153 | B2 | | 2/2018 | Tremblay |
| 9,976,612 | B2 | | 5/2018 | Tremblay |
| 10,436,265 | B2 | * | 10/2019 | Stevenson ............ F16D 65/123 |
| 2007/0193836 | A1 | | 8/2007 | Walker et al. |
| 2008/0041674 | A1 | | 2/2008 | Walker et al. |
| 2013/0008749 | A1 | | 1/2013 | Sandberg et al. |
| 2019/0048949 | A1 | | 2/2019 | Stevenson |

FOREIGN PATENT DOCUMENTS

| | | |
|---|---|---|
| EP | 1798438 B1 | 11/2012 |
| EP | 3441638 A1 | 2/2019 |
| RU | 2093726 C1 | 10/1997 |
| WO | 2019115287 A1 | 6/2019 |

OTHER PUBLICATIONS

U.S. Appl. No. 16/748,836, by Honeywell International Inc. (Inventors: Spray et al. ), filed Jan. 22, 2020.

Extended European Search Report from counterpart European U.S. Application. No. 21167902., dated Sep. 6, 2021, 7 pp.

Response to Extended European Search Report from counterpart European Application21/167,902 2, dated Sep. 6, 2021, filed Sep. 6, 2021, 66 pp.

* cited by examiner

BRAKE DISC INSERT WITH BRIDGE MEMBER

TECHNICAL FIELD

The present disclosure relates to wheel brake systems of a vehicle.

BACKGROUND

Vehicles, such as aircrafts, may use a wheel brake system that includes a multi-disc brake assembly. For example, the multi-disc brake assembly may include a plurality of rotors engaged with a wheel and a plurality of stators interleaved with the rotors. The rotors and wheel are configured to rotate around an axle, while the stators remain rotationally stationary. To decelerate rotational motion of a rotating wheel, the brake assembly may displace pistons against a pressure plate to squeeze the rotating rotors attached to the wheel against the stationary stators, therefore producing torque that decelerates the rotational motion of the wheel. In some examples, the rotors may be engaged with the wheel via rotor drive keys positioned on an interior surface of the wheel. In some such examples, the rotors may define slots configured to receive the rotor drive keys.

SUMMARY

In general, the disclosure describes articles, systems, and techniques relating to a drive insert for a brake disc in a wheel brake system of a vehicle. The brake disc may be configured to have one or more drive slots around the brake disc periphery, the drive slots being configured to receive a rotor drive key of the wheel brake system. The drive insert is configured to mechanically couple with the brake disc at a drive slot. The drive insert may be configured such that some portion of the drive insert resides within the drive slot of the brake disc. The drive insert may be configured to help protect the brake disc against, for example, the mechanical stresses borne by the drive slot of the brake disc during braking operations of a wheel braking system.

In examples described herein, the drive insert includes a first insert member, a second insert member, and a bridge member extending between the first insert member and the second insert member. The first and second insert members are configured to be positioned over a respective surface of the brake disc, such as by sliding the insert member over the respective surface in a tangential direction of the brake disc. The bridge member is configured to extend between the first insert member and the second insert member when the first and second insert members are positioned over the respective surfaces of the brake disc.

The drive insert may be configured such that the first insert member, the second insert member, and the bridge member substantially secure the drive insert to the brake disc without requiring a fastener (e.g., a rivet) or other element that penetrates through the drive insert and into the brake disc.

In one example, the drive insert includes a first insert member configured to be positioned over a first surface of a brake disc, wherein the first surface is adjacent to a drive slot on a perimeter of the brake disc. The first insert member is configured to be slidable over the first surface in a first direction substantially tangential to the brake disc. The drive insert includes a second insert member configured to be positioned over a second surface of the brake disc, wherein the second surface is adjacent to the drive slot on the perimeter of the brake disc. The second insert member is configured to be slidable over the second surface in a second direction substantially opposite the first direction. A bridge member is configured to extend from the first insert member to the second insert member when the first insert member is positioned over the first surface and the second insert member is positioned over the second surface, wherein the bridge member is configured to limit movement of the first insert member and the second insert member in a tangential direction of the brake disc when the bridge member extends from the first insert member to the second insert member.

In one example, a technique includes positioning a first insert member on a brake disc by at least sliding the first insert member in a tangential direction of the brake disc over a first surface, wherein the first surface is adjacent to a drive slot extending axially through a perimeter of the brake disc. The technique includes positioning a second insert member on a brake disc by at least sliding the second insert member in a tangential direction of the brake disc over a second surface, wherein the second surface is adjacent to the drive slot. The technique includes positioning a bridge member between the first and second insert members when the first insert member is positioned over the first surface and the second insert member is positioned over the second surface, wherein the bridge member is configured to limit movement of the first insert member and the second insert member in a tangential direction of the brake disc when the bridge member extends from the first insert member to the second insert member.

Clause 1: An apparatus comprising a first insert member configured to be positioned over a first surface of a brake disc, wherein the first surface is adjacent to a drive slot on a perimeter of the brake disc, and wherein the first insert member is configured to be slidable over the first surface in a first direction substantially tangential to the brake disc; a second insert member configured to be positioned over a second surface of the brake disc, wherein the second surface is adjacent to the drive slot on the perimeter of the brake disc, wherein the second insert member is configured to be slidable over the second surface in a second direction substantially opposite the first direction; and a bridge member configured to extend from the first insert member to the second insert member when the first insert member is positioned over the first surface and the second insert member is positioned over the second surface, wherein the bridge member is configured to limit movement of the first insert member and the second insert member in a tangential direction of the brake disc when the bridge member extends from the first insert member to the second insert member.

Clause 2: The apparatus of clause 1, wherein the bridge member is configured to establish a clearance between the bridge member and a support surface of the drive slot when the bridge member extends from the first insert member to the second insert member.

Clause 3: The apparatus of clause 1 or 2, wherein the bridge member is a spring having a first end and a second end, wherein the first end of the bridge member is configured to contact the first insert member and the second end of the bridge member is configured to contact the second insert member when the bridge member extends from the first insert member to the second insert member.

Clause 4: The apparatus of any of clauses 1 to 3, wherein the bridge member is configured to be in compression when the first insert member is positioned over the first surface, the second insert member is positioned over the second surface, and the bridge member extends from the first insert member to the second insert member.

Clause 5: The apparatus of any of clauses 1 to 4, wherein the first insert member comprises a body section, the body section comprising a drive face and a back face opposite the drive face, wherein the back face is configured to engage a torque face of the brake disc when the first insert member is positioned over the first surface, the torque face defining a portion of the drive slot.

Clause 6: The apparatus of clause 5, wherein the first insert member further comprises a first tab extending from the body section and a second tab extending from the body section.

Clause 7: The apparatus of clause 5 or 6, wherein the first tab is configured to engage the first surface when the back face engages the torque face of the brake disc, and wherein the second tab is configured to engage a third surface of the brake disc opposite the first surface when the back face engages the torque face.

Clause 8: The apparatus of any of clauses 1 to 7, wherein the first insert member defines a bridge slot configured to receive the bridge member when the bridge member extends from the first insert member to the second insert member.

Clause 9: The apparatus of any of clauses 1 to 8, wherein the first insert member comprises an insert lip configured to insert into a recess of the brake disc when the first insert member is positioned over the first surface.

Clause 10: The apparatus of clause 9, wherein the insert lip comprises a lip bearing surface configured to face some portion of a surface of the recess of the brake disc and limit movement of the first insert member in a radial direction of the brake disc when the insert lip is inserted into the recess of the brake disc.

Clause 11: The apparatus of any of clauses 1 to 10, wherein the first insert member comprises a body section, the body section comprising a drive face defining a bridge slot; a back face opposite the drive face, wherein the back face is configured to engage a torque face of the brake disc when the first insert member is positioned over the first surface; and an insert lip protruding from the back face, wherein the insert lip is configured to insert into a recess of the brake disc and a first end of the bridge member is configured to insert into the bridge slot when the back face of the first insert member engages the torque face.

Clause 12: The apparatus of clause 11, wherein the first insert member comprises: a first tab extending from the body section; and a second tab extending from the body section, wherein the first tab and the second tab are configured to limit movement of the first insert member in an axial direction of the brake disc when the back face engages the torque face, wherein the insert lip of the first insert member is configured to limit movement of the first insert member in a radial direction of the brake disc when the back face of the first insert member engages the torque face, and wherein the bridge member is configured to limit movement of the first insert member in a tangential direction of the brake disc when the back face of the first insert member engages the torque face and the first end of the bridge member inserts into the bridge slot.

Clause 13: A system comprising the brake disc and the apparatus of any of clauses 1 to 12.

Clause 14: An assembly comprising: a brake disc defining: a drive slot extending axially through the brake disc on a perimeter of the brake disc; a first surface adjacent to the drive slot; and a second surface adjacent to the drive slot; a first insert member, the first insert member comprising: a first body section defining a first bridge slot; and a first body tab extending from the first body section, wherein the first body tab is configured to be positioned over the first surface of the brake disc; a second insert member, the second insert member comprising: a second body section defining a second bridge slot; and a second body tab extending from the second body section, wherein the second body tab is configured to be positioned over the second surface of the brake disc; and a bridge member configured to extend from the first insert member to the second insert member, wherein the bridge member has a first end and a second end, and wherein the first end is configured to insert into the first bridge slot and the second end is configured to insert into the second bridge slot when the first body tab is positioned over the first surface, the second body tab is positioned over the second surface, and the bridge member extends from the first insert member to the second insert member.

Clause 15: The assembly of clause 14, wherein: the brake disc comprises a first torque face adjacent to the first surface, the brake disc comprises a second torque face adjacent to the second surface, the first body section comprises a first back face configured to engage the first torque face when the first body tab is positioned over the first surface and the bridge member extends from the first insert member to the second insert member, and the second body section comprises a second back face configured to engage the second torque face when the second body tab is positioned over the second surface and the bridge member extends from the first insert member to the second insert member.

Clause 16: The assembly of clause 14 or 15, wherein the first body tab comprises a first body first tab, the first body section further comprising a first body second tab extending from the first body section, wherein the first body first tab and the first body second tab define a space configured to receive the brake disc, and wherein the second body tab comprises a second body first tab, the second body further comprising a second body second tab extending from the second body section, wherein the second body first tab and the second body second tab define a space configured to receive the brake disc.

Clause 17: The assembly of any of clauses 14 to 16, wherein: the first insert member comprises a first insert lip configured to insert into a first recess of the brake disc when the first body tab is positioned over the first surface and the bridge member extends from the first insert member to the second insert member; and the second insert member comprises a second insert lip configured to insert into a second recess of the brake disc when the second body tab is positioned over the second surface and the bridge member extends from the first insert member to the second insert member.

Clause 18: A method comprising: positioning a first insert member on a brake disc by at least sliding the first insert member in a tangential direction of the brake disc over a first surface, wherein the first surface is adjacent to a drive slot extending axially through a perimeter of the brake disc; positioning a second insert member on a brake disc by at least sliding the second insert member in a tangential direction of the brake disc over a second surface, wherein the second surface is adjacent to the drive slot; and positioning a bridge member between the first and second insert members when the first insert member is positioned over the first surface and the second insert member is positioned over the second surface, wherein the bridge member is configured to limit movement of the first insert member and the second insert member in a tangential direction of the brake disc when the bridge member extends from the first insert member to the second insert member.

Clause 19: The method of clause 18, wherein positioning the first insert member on the brake disc comprises inserting an insert lip of the first insert member into a first recess of the brake disc.

Clause 20: The method of clause 18 or 19, wherein positioning the first insert member on the brake disc comprises covering a portion of a first torque face of the drive slot with a body section of the first insert member by at least sliding a first tab of the first insert member over the first surface, wherein the first torque face is adjacent to the first surface.

The details of one or more examples are set forth in the accompanying drawings and the description below. Other features, objects, and advantages will be apparent from the description and drawings, and from the claims.

DETAILED DESCRIPTION

Figure 1:
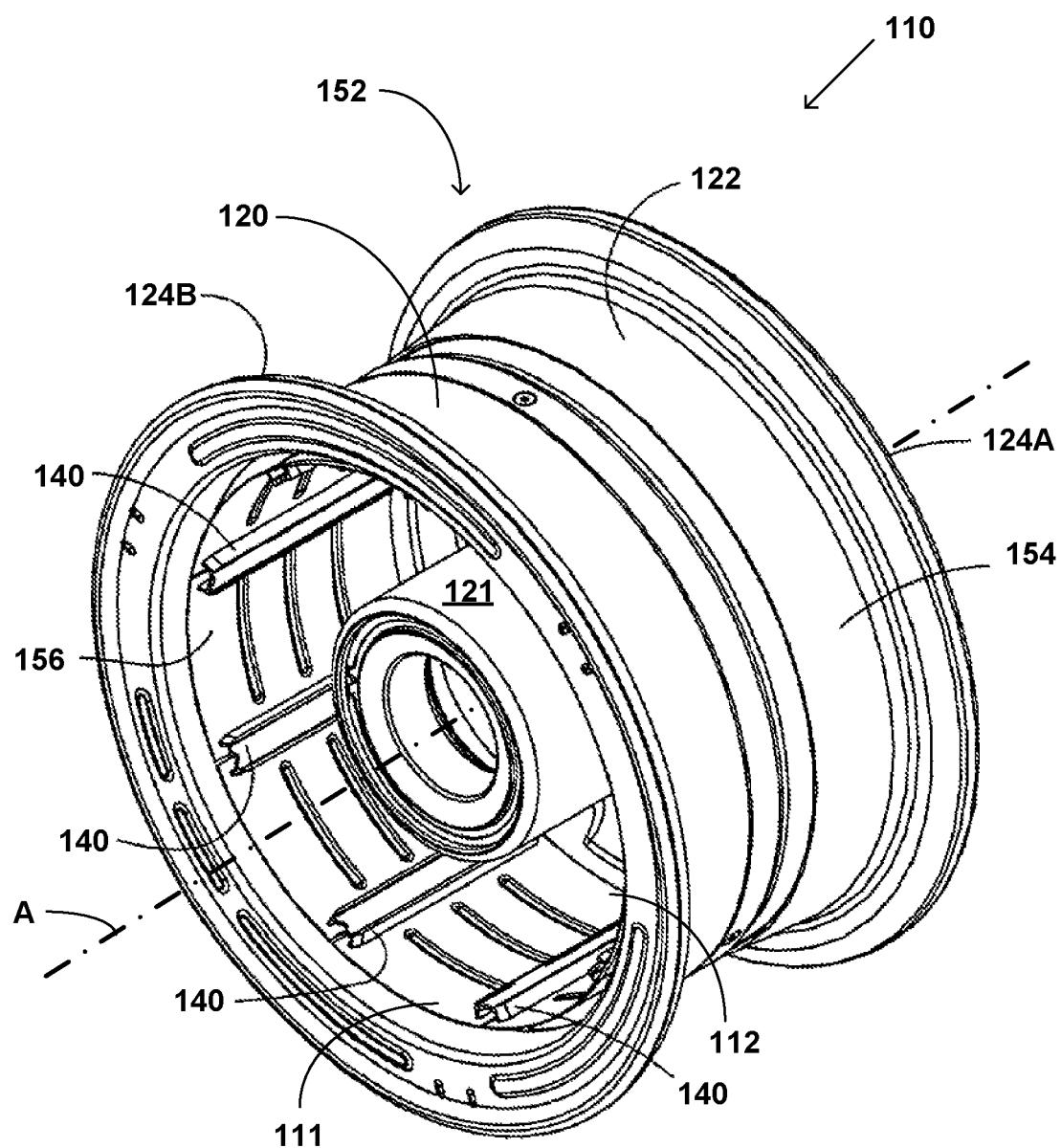
FIG. 1 is a perspective view illustrating an example wheel including a plurality of rotor drive keys on an interior surface of the wheel.

The disclosure describes articles, systems, and techniques relating to a drive insert for a brake disc in a wheel brake system of a vehicle. The drive insert described herein is configured to be mechanically coupled to a brake disc, which may be one of a plurality of brake discs of a brake disc stack of a vehicle braking system. In some examples, the brake disc defines and/or includes one or more drive slots around the brake disc periphery, and the drive insert is configured to mechanically couple with the brake disc at a drive slot. The drive insert is configured such that at least some portion of the drive insert resides between the drive slot of a brake disc and a rotor drive key when the brake disc is assembled within a braking system. The drive insert may be configured to protect the brake disc against, for example, the mechanical stresses borne by the drive slot of the brake disc during braking operations of a wheel braking system. For example, the drive insert may be configured to help distribute the load from the drive key and/or splines to the brake disc and/or to reduce wear on the brake disc.

In examples described herein, the drive insert includes a first insert member, a second insert member, and a bridge member. The first insert member is configured to be slidable over a first surface of a brake disc, where the first surface is adjacent to a drive slot on the outer perimeter of the brake disc. For example, the first insert member may be configured to slide over the first surface in a first tangential direction of the brake disc. The second insert member is configured to be slidable over a second surface of the brake disc, where the second surface is adjacent to the drive slot and generally separated from the first surface by the drive slot. For example, the second insert member may be configured to slide over the second surface in a second tangential direction substantially opposite the first tangential direction. The bridge member is configured to extend from the first insert member to the second insert member when the first insert member is positioned over the first surface and the second insert member is positioned over the second surface to limit movement of the first insert member and the second insert member in a tangential direction of the brake disc. For example, the bridge member can be configured to be held in compression when it is positioned in the drive slot and positioned to extend between the first and second insert members. In some examples, the bridge member is a spring (e.g., a flat spring) including a first end and a second end, and the spring is configured such that the first end contacts the first insert member and the second end contacts the second insert member when the first insert member and second insert member are positioned on the brake disc and the bridge member is positioned between the first and second insert members. In some examples, the bridge member is configured to deform plastically (e.g., from a force provided by an operator) when a first end and a second end of the bridge member contact the first insert member and second insert member respectively.

In some examples, the drive insert is configured such that the first insert member, the second insert member, and the bridge member substantially secure the drive insert to the brake disc without requiring a fastener (e.g., a rivet) or other element to penetrate through the drive insert and into the brake disc. Rivets and other fasteners which attach drive inserts to brake rotors may undergo fatigue due to the cyclic vibrations and stresses which occur over repeated braking operations. This may lead to rivet failure and compromise of the attachment between the drive insert and the brake disc, as well as lead to the presence of loose hardware floating within the brake system. Additionally, rivets and other through-fasteners may necessarily require a rivet hole through the surface of a brake disc, which can compromise the surface integrity of the brake disc and potentially create stress concentrations around the hole when the brake disc is subject to braking load. The installation of one or more rivets within a brake disc may also stress the brake disc in the immediate vicinity of the rivets, as the rivet tail may expand within the rivet hole to provide a fastening function between a drive insert and the brake disc.

The drive inserts described herein may be configured to be used with any suitable wheel brake system. Wheel brake systems may include a wheel hub configured to rotate around a central axle, with the wheel hub mechanically coupled to the axle by bearings or some other mechanism which allows the wheel to rotate around the axle. In some cases, a wheel brake system may include one or more rotor brake discs configured to rotate around the axle substantially synchronously with the wheel. The wheel brake system may further include one or more stator brake discs interleaved with the rotor brake discs, with the stator brake discs configured to remain stationary with respect to the axle. The rotor brake discs and stator brake discs may thus comprise a disc stack where, during wheel rotation, the rotor brake discs rotate substantially synchronously with the wheel around the axle while the interleaved stator brake discs remain stationary with respect to the axle. Each rotor brake disc and stator brake disc may have one or more friction surfaces configured to face a friction surface of an adjacent brake disc within the disc stack.

Each rotor brake disc and stator brake disc may also be configured to translate in a direction substantially parallel with the axle, enabling the disc stack to be compressed and contact established between adjacent rotor and stator brake discs. During a braking operation, the disc stack may be compressed, for example by one or more piston and cylinder assemblies, in order to urge the friction surfaces into engagement. The engagement between friction surfaces of the rotor brake discs rotating around the axle and the stator brake discs stationary with respect to the axle converts the kinetic energy of the rotating rotor brake discs into thermal energy and slows the rotation of the rotor brake discs. Due to the mechanical coupling between the rotor brake discs and the wheel, rotation of the wheel is similarly reduced.

During the braking operation, while the disc stack is compressed, the rotor brake discs and stator brake discs may generate significant shearing forces on their respective friction surfaces. These forces are generally transmitted through the rotor brake discs and stator brake discs to torque transmitting members such as the aforementioned brake disc drive slots. Each rotor brake disc may include one or more drive slots around an outer perimeter of the rotor disc brake. When the brake assembly is assembled, a rotor drive key mounted to the wheel may extend through a respective drive slot. The rotor drive key and drive slot may be configured such that the rotor drive key imparts force to the drive slot during braking, generating stresses in the rotor brake disc in the neighborhood of (e.g., proximate to) the drive slot. The drive insert disclosed here may be configured to protect the brake disc against, for example, the mechanical stresses borne by the drive slot of the brake disc as a result of forces on the brake disc generated from contact with the friction surface of one or more adjacent brake discs.

FIG. 1 is a perspective view of an example wheel 110 including a plurality of rotor drive keys 140 on an interior surface 156 of wheel 110. In some examples, wheel 110 is a part of an aircraft vehicle. In other examples, wheel 110 may be a part of any other vehicle, such as, for example, any marine vessel, land vehicle, or other vehicle. Wheel 110 may include a rim 152 defining an exterior surface 154 and interior surface 156. Rim 152 may include tubewell 120, wheel hub 121, and outboard tubewell 122. In some examples, interior surface 156 may include an inner diameter of tubewell 120. For example, in some cases, interior surface 156 may be referred to as an inner diameter surface of wheel 110.

In some examples, a tire (not shown) may be mounted on exterior surface 154 of rim 152. For example, wheel 110 may include an inboard bead seat 124B and an outboard bead seat 124A configured to retain a tire on exterior surface 154 of rim 152.

Wheel 110 is configured to engage with one or more rotors (not shown in FIG. 1) of a braking assembly. For example, as shown in the example of FIG. 1, a plurality of rotor drive keys 140 are attached to interior surface 156, and each rotor drive key of the plurality of rotor drive keys 140 may be configured to engage with one or more rotors of a brake disc stack of a braking assembly. An example braking assembly will be described in more detail with respect to FIG. 2.

In some examples, each rotor drive key of the plurality of rotor drive keys 140 extends in a substantially axial direction of wheel 110 (e.g., in a direction parallel to the axis label "A" in FIG. 1, which can be an axis of rotation of wheel 110). For example, a length of each rotor drive key of the plurality of rotor drive keys 140 may extend in the substantially axial (e.g., axial or nearly axial to the extent permitted by manufacturing tolerances) direction of the axis A. In some such examples, the respective length of each rotor drive key 140 may extend from (or near) a first edge 111 of wheel 110 to (or close to) a second edge 112 of wheel 110. In this way, in some examples, a length of a rotor drive key 140 of the plurality of rotor drive keys 140 may be the same or substantially similar to (e.g., within 10%) a width of wheel 110 from the first edge to the second edge. In other examples, a length of a rotor drive key 140 may be less than the width of wheel 110.

The plurality of rotor drive keys 140 extending in the substantially axial direction may enable wheel 110 to slide onto a braking assembly. For example, a plurality of rotors of a braking assembly may include drive slots configured to receive the plurality of rotor drive keys 140, enabling the plurality of rotor drive keys 140 to be slid into respective drive slots of the plurality of rotors. In other examples, one or more rotor drive keys of the plurality of rotor drive keys 140 may be oriented in a different direction and/or may engage with one or more rotors in a different manner.

The plurality of rotor drive keys 140 may include any suitable number of rotor drive keys. The number of drive keys may be vehicle specific and may depend on, e.g., loads, size of parts, material properties, and the like. In some examples, the number of the rotor drive keys included in the plurality of rotor drive keys 140 may correspond to a number of drive slots defined by a plurality of rotors of a braking assembly configured to receive the plurality of rotor drive keys 140. For example, each rotor drive key of the plurality of rotor drive keys 140 may correspond to a respective slot defined by the plurality of rotors of a braking assembly.

As illustrated in the example of FIG. 1, in some examples, the plurality of rotor drive keys 140 may be mounted at substantially equal circumferential distances around interior surface 156 of wheel 110. In other examples, one or more of the plurality of rotor drive keys 140 may be mounted a different circumferential distance from an adjacent rotor drive than at least one other rotor drive key. Here and elsewhere, circumferential distance means the length of an arc on the interior surface 156 of wheel 110 where the arc is in a plane perpendicular to the substantially axial direction of wheel 110. Rotor drive keys 140 may be integrally formed with tubewell 120 or may be separate from and mechanically affixed to tubewell 120.

Figure 2:
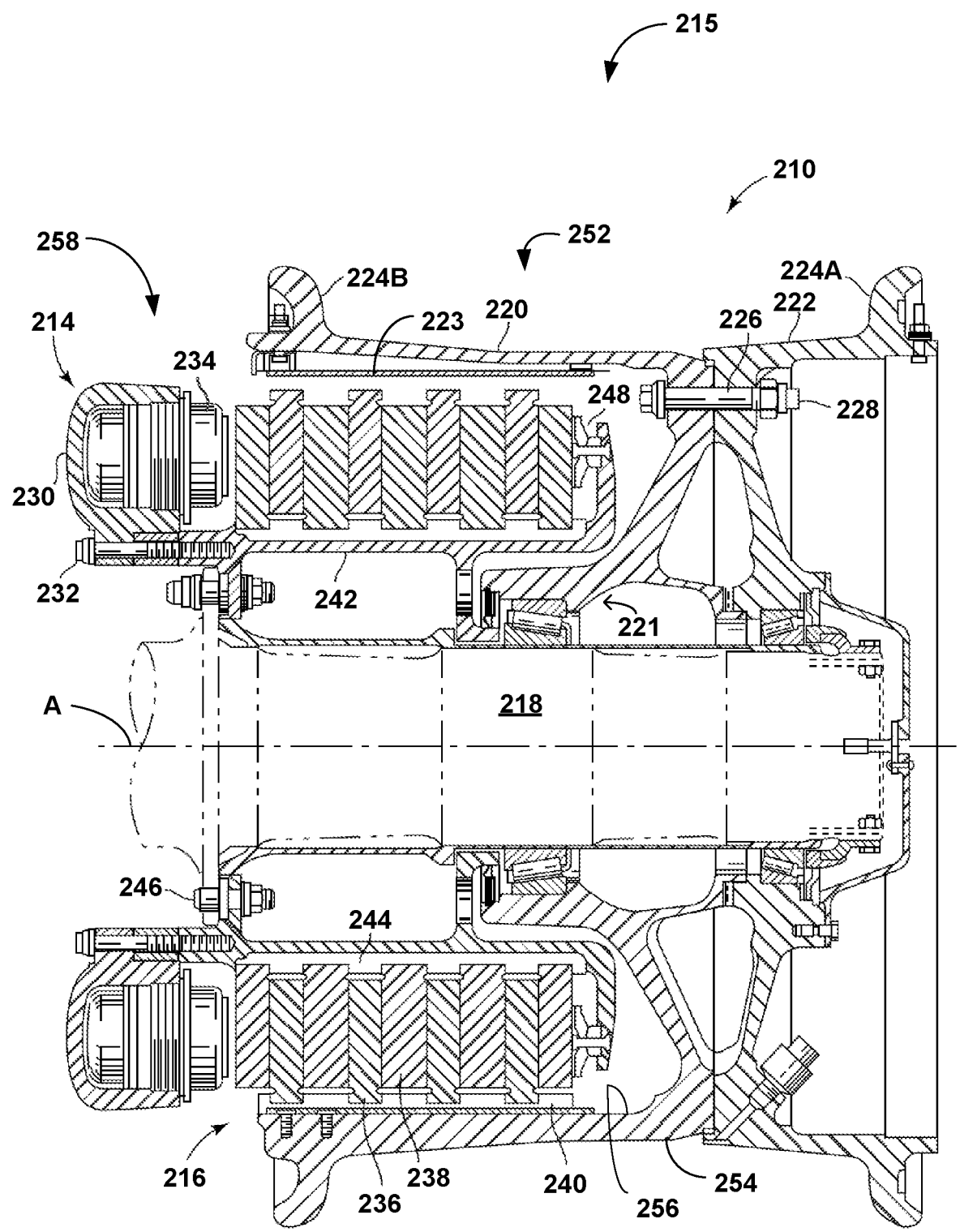
FIG. 2 is a schematic cross-sectional view of an example wheel and brake assembly including the wheel of FIG. 1.

FIG. 2 is a schematic cross-sectional view of an example wheel and brake assembly 215 including a wheel 210 and a braking assembly 258. Wheel and brake assembly 215 is shown and described to provide context to the example drive inserts described here. The drive inserts described herein, however, may be used with any suitable wheel and brake assembly in other examples.

Wheel 210 includes tubewell 220, wheel hub 221, outboard tubewell 222, outboard bead seat 224A, and inboard bead seat 224B, rim 252, exterior surface 254, and interior surface 256, which may be configured individually and in relation to each other in the same manner as that discussed for the like-named components of wheel 110 (FIG. 1). Wheel 210 may be configured to be rotatably carried on axle 218. For example, wheel 210 may be rotatably carried on axle 218 by wheel hub 221. In turn, wheel 210 may impart motion to a vehicle including or mounted on the wheel and brake assembly 215. In the example shown in FIG. 2, tubewell 220 and outboard tubewell 222 are mechanically coupled by lug bolt 226 and lug nut 228. Other connection techniques may be used in other examples.

Braking assembly 258 includes an actuator assembly 214 and a brake stack 216. Actuator assembly 214 includes actuator housing 230, actuator housing bolt 232, and piston 234. Brake stack 216 includes a plurality of brake discs, which include interleaved rotor brake discs 236 and stator brake discs 238. Rotor brake discs 236 are configured to move relative to stator brake discs 238, e.g., rotationally about axis A and axially along axis A relative to stator brake discs 238. Rotor brake discs 236 engage with wheel 210, and in particular tubewell 220, by rotor drive keys 240. Stator brake discs 238 are mounted to torque tube 242 by splines 244. Wheel and brake assembly 215 may support any variety of private, commercial, or military aircraft or other type of vehicle.

Wheel and brake assembly 215 may be mounted to a vehicle via torque tube 242 and axle 218. In the example of FIG. 2, torque tube 242 is affixed to axle 218 by a plurality of bolts 246. Torque tube 242 supports actuator assembly 214 and stator brake discs 238. Axle 218 may be mounted on a strut of a landing gear (not shown) or other suitable component of the vehicle to connect wheel and braking assembly 215 to the vehicle.

During operation of the vehicle, braking may be necessary from time to time, such as during landing and taxiing procedures of an aircraft. Wheel and brake assembly 215 is configured to provide a braking function to the vehicle via actuator assembly 214 and brake stack 216. Actuator assembly 214 includes actuator housing 230 and piston 234. Actuator assembly 214 may include different types of actuators such as one or more of, e.g., an electrical-mechanical actuator, a hydraulic actuator, a pneumatic actuator, or the like. During operation, piston 234 may extend away from actuator housing 230 to axially compress brake stack 216 against compression region 248 for braking.

Rotor brake discs 236 are slidably engaged with rotor drive keys 240 for common rotation with tubewell 220 and rotor drive keys 240. Stator brake discs 238 are mounted to torque tube 242 by splines 244. In the example of FIG. 2, brake stack 216 includes four rotors and five stators. However, a different number of rotors and/or stators may be included in brake stack 216 in other examples. Rotor brake discs 236 and stator brake discs 238 may provide opposing friction surfaces for braking an aircraft. In some examples, wheel and brake assembly 215 may include a heat shield 223 between rotor brake discs 236 and tubewell 220 in order to, for example, limit thermal transfer between brake stack 216 and wheel 210.

In some examples, splines 244 may be circumferentially spaced about an outer portion of torque tube 242. Stator brake discs 238 may include a plurality of radially inwardly disposed lug notches along an inner diameter of the brake disc configured to engage with splines 244. Similarly, rotor brake discs 236 may include a plurality of radially inwardly disposed drive slots along an outer periphery (e.g., an outer diameter in the case of a disc having a circular cross-section) of the rotor brake disc. The drive slots may be configured to engage with rotor drive keys 240. As such, rotor brake discs 236 will rotate with the motion of wheel 210 while stator brake discs 238 remain stationary, allowing the friction surfaces of an adjacent stator brake disc 238 and rotor brake disc 236 to engage with one another to decelerate the rotation of wheel 210.

Figure 3:
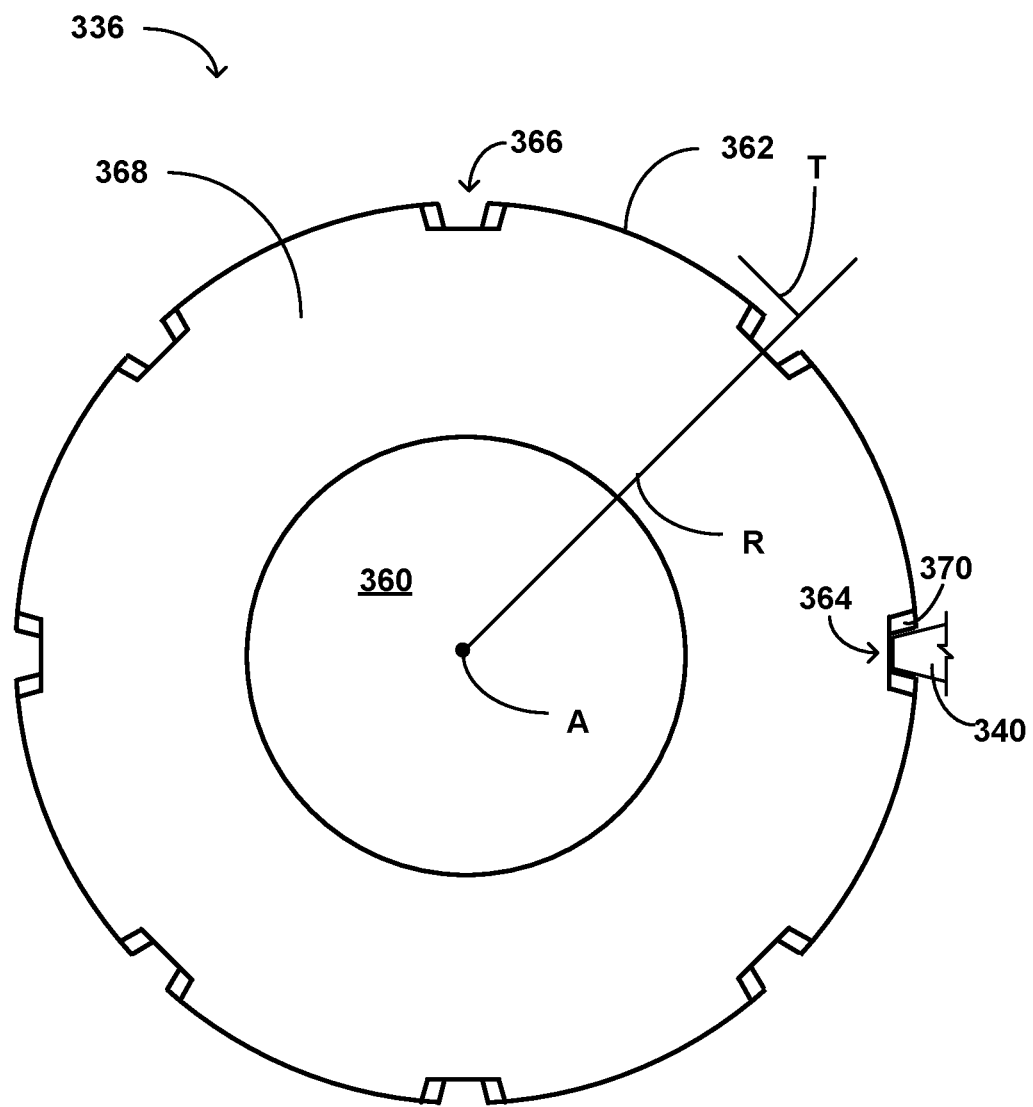
FIG. 3 is a plan view illustrating an example brake disc having a plurality of drive slots.

FIG. 3 is a diagram illustrating an example rotor brake disc 336, which is an example of one or more of rotor brake discs 236 (FIG. 2). Rotor brake disc 336 can be formed from any suitable material, such as, but not limited to a carbon-carbon composite. Rotor brake disc 336 defines a central aperture 360 extending through rotor brake disc 336. Rotor brake disc 336 further defines a plurality of drive slots around an outer perimeter 362 of rotor brake disc 336. The plurality of drive slots comprises, for example, drive slot 364 and drive slot 366, as well as others similarly depicted. Rotor brake disc 336 further includes friction surface 368. Rotor brake disc 336 may include a second friction surface (not shown) opposite friction surface 368. Friction surface 368 and the second friction surface of brake disc 336 are configured to engage with adjacent stator discs during a braking operation of a brake assembly including a brake disc stack, of which disc 336 is part.

Central aperture 360 may be configured to surround an axle such as axle 218 and allow rotation of rotor brake disc 336 around and relative to the axle (FIG. 2). For example, central aperture 360 may be configured to receive torque tube 242, surrounding and affixed to axle 218 by bolts 246. The plurality of drive slots such as 364, 366 may be configured to slidably engage a plurality of rotor drive keys, such as the plurality of rotor drive keys 140, 240 (FIGS. 1 and 2). As discussed, each rotor drive key of the plurality of rotor drive keys 140, 240 may extend in a substantially axial direction of wheel 110, 210 (e.g., parallel to axis of rotation A shown in FIG. 3) and may be mounted around interior surface 156, 256 of wheel 110, 210 (FIG. 1, 2). When the plurality of drive slots slidably engages a plurality of rotor drive keys, such as plurality of rotor drive keys 140, 240, and central aperture 360 surrounds an axle such as axle 218, rotor brake disc 336 is configured to receive a force from the plurality of rotor drive keys which acts tangentially on rotor disc 336 and generates substantially synchronous rotation of rotor disc 336 with a wheel such as wheel 110, 210 (FIG. 1, 2).

For example, FIG. 3 illustrates a portion of a rotor drive key 340 extending through drive slot 364. Rotor drive key 340 may be a rotor drive key of the plurality of rotor drive keys 140, 240 (FIGS. 1 and 2). Drive slot 364 is configured to slidably engage rotor drive key 340 in an axial direction of rotor brake disc 336. One or more of the drive slots (e.g., a subset of the drive slots or all of the drive slots) defined by rotor brake disc 336 may have a portion of a respective rotor drive key extending through the drive slot in a manner similar to that depicted for drive slot 364 and rotor drive key 340. Rotor drive key 340 may extend in a substantially axial direction A of a wheel such as wheel 110, 210 (FIGS. 1 and 2) and be mounted around an interior surface such as interior surface 156, 256 of wheel 110, 210, such that when the wheel rotates around an axle, such as axle 218, rotor drive key 340 correspondingly rotates around the axle. The rotation of rotor drive key 340 causes rotor drive key 340 to impart a force acting tangentially on rotor brake disc 336, generating substantially synchronous rotation of rotor disc 336 with the wheel.

During a braking operation, as wheel 210 rotates relative to axle 218, when a ram such as piston 234 compresses brake stack 216 (FIG. 2), rotor brake disc 336 of brake stack 216 may slidably translate over a plurality of rotor drive keys 140, 240 in an axial direction substantially parallel (e.g., parallel or nearly parallel to the extent permitted by manufacturing tolerances) to the axis A extending through central aperture 360. The axial translation of rotor brake disc 336 may bring friction surface 368 of rotor brake disc 336 into contact with a friction surface of one or more adjacent stator brake discs. As discussed, stator brake discs such as stator brake discs 238 may be mounted to torque tube 242 by splines 244 (FIG. 2), and may be rotationally stationary with respect to axle 218. Consequently, when rotor brake disc 336 is rotating with respect to an axle such as axle 218 (e.g., wheel 210 is turning) and rotor brake disc 336 is axially translated such that friction surface 368 contacts the friction surface of an adjacent stator brake disc, the plurality of rotor drive keys 140, 240 may impart a force on the plurality of drive slots such as drive slots 364, 366 as the frictional contact converts kinetic energy to thermal energy. For example, during the braking operation, the plurality of rotor drive keys 140, 240 may impart a force on the plurality of drive slots in a substantially tangential direction of rotor brake disc 336 as friction surface 368 engages a friction surface of an adjacent stator brake disc, when a wheel such as wheel 210 is experiencing rotation relative to an axle such as axle 218. The force imparted by the plurality of rotor drive keys such as drive key 340 on the plurality of drive slots such as drive slots 364, 366 may be an action force or a reaction force.

Here and elsewhere, an axial direction of a brake disc means the direction of a vector coincident with an axis extending through a central aperture of the rotor brake disc. For example, FIG. 3 illustrates an axis A perpendicular to the page and extending through central aperture 360. An axial direction of rotor brake disc 336 is the direction of a vector coincident with axis A. Axis A of FIG. 3 may correspond to axis A of FIG. 1 and/or FIG. 2. A radial direction of a brake disc means the direction of a vector coincident with a line perpendicular to and intersecting the axis extending through the central aperture, and intersecting the outer perimeter of the brake disc. For example, FIG. 3 illustrates a line R perpendicular to and intersecting axis A extending through central aperture 360, and intersecting outer perimeter 362 of rotor brake disc 336. A radial direction of rotor brake disc 336 is the direction of a vector coincident with line R. A tangential direction of a brake disc means the direction of a vector coincident with a line perpendicular to the axial direction of the brake disc and perpendicular to the radial direction of the brake disc. For example, FIG. 3 illustrates a line T perpendicular to axis A extending through central aperture 360 and perpendicular to line R. A tangential direction of rotor brake disc 336 is the direction of a vector coincident with line T.

Each of the plurality of drive slots, including slots 364, 366, in rotor brake disc 336 may be reinforced by a drive insert, such as drive insert 370 within drive slot 364. While drive insert 370 and drive slot 364 are primarily referred to in the description of FIG. 3 as well as other figures, the description of drive insert 370 and drive slot 364 may apply to the other drive slots and drive inserts of rotor brake disc 336 and other brake discs described herein. Additionally, while rotor brake disc 336 is primarily referred to in the description of FIG. 3 as well as other figures, the drive inserts described herein may also be utilized on a drive slot of a stator brake disc, such as one or more of stator brake discs 238 (FIG. 2).

Drive insert 370 is configured to help relieve the effect of stresses imparted to drive slot 364 from rotor drive key 340 during a braking operation. Drive insert 370 provides a sliding and a bearing surface to act against rotor drive key 340, and, thus, may minimize or even eliminate the extent to which rotor drive key 340 engages directly with a surface of rotor brake disc 336. Drive insert 370 is configured to substantially cover certain areas (e.g., all or part) of drive slot 364 and is configured to install on rotor brake disc 336 such that drive insert 370 is between rotor drive key 340 and drive slot 364 when rotor drive key 340 imparts tangential forces to drive slot 364 during braking operations. Drive insert 370 is configured to provide for secure placement within drive slot 364 in the axial, radial, and tangential directions of rotor brake disc 336, in order to maintain a substantially fixed position relative to drive slot 364 as rotor brake disc 336 rotates during rotation of wheel 110, 210 (FIG. 1,2). Drive insert 370 may be configured to provide secure placement in the absence of rivets or other fastening mechanisms penetrating rotor brake disc 336. The use of drive insert 370 may reduce wear of drive slot 364 as rotor drive key 340 cyclically loads and slides against drive slot 364 over repeated braking operations.

Figure 4:
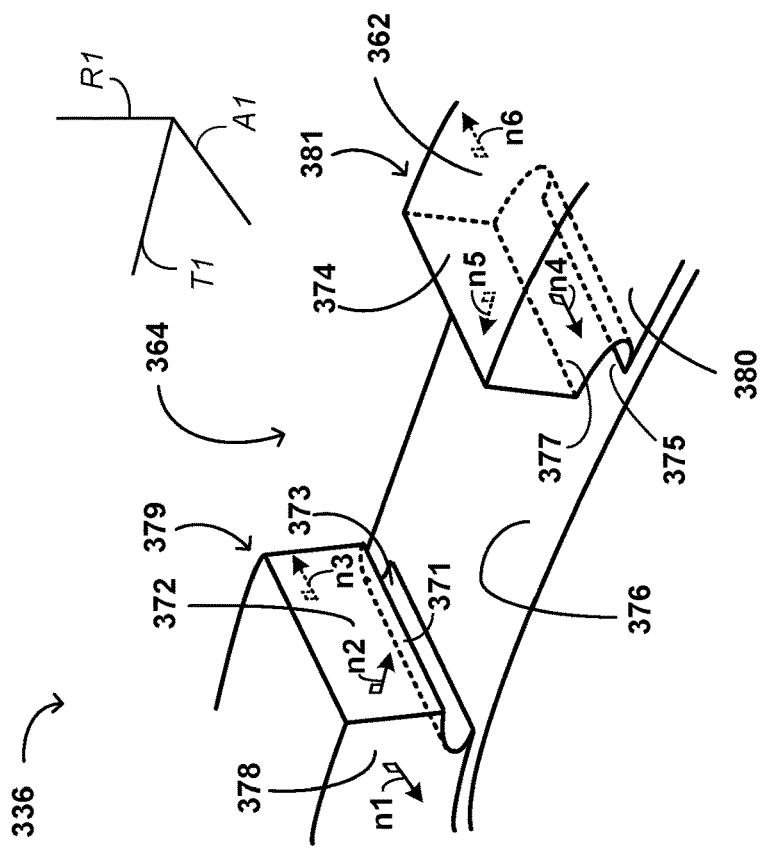
FIG. 4 is an isometric view of a section of a brake disc.

Drive insert 370 engages with drive slot 364 of brake disc 336 such that drive insert 370 resides between the torque faces of drive slot 364 when rotor drive key 340 loads drive slot 364. FIG. 4 is a diagram schematically illustrating a section of rotor brake disc 336 and a section of drive slot 364 defined by brake disc 336. Drive slot 364 is defined by outer perimeter 362 of rotor brake disc 336. Axial, radial, and tangential directions are indicated by line A1, line R1, and line T1, respectively. Line A1, line R1, and line T1 may be parallel to line A, line R, and line T respectively (FIG. 3).

Drive slot 364 includes a first torque face 372 and a second torque face 374 (shown as a hidden surface in FIG. 4) on opposite sides of drive slot 364 from each other. In addition, in the example shown in FIG. 4, torque faces 372, 374 oppose each other. First torque face 372 and second torque face 374 may each be positioned along outer perimeter 362 of rotor brake disc 336. First torque face 372 and/or second torque face 374 define a portion of drive slot 364, and are each configured to bear a tangential force imparted by a rotor drive key (e.g., rotor drive key 340 (FIG. 3)) during a braking operation. First torque face 372 and second torque face 374 may be configured to face and/or engage rotor drive key 340 (FIG. 3) when rotor drive key 340 extends axially through drive slot 364. First torque face 372 and second torque face 374 may substantially face each other, such that a first vector from first torque face 372 toward second torque face 374 projects onto line T1 in a first tangential direction, and a second vector from second torque face 374 toward first torque face 372 and parallel to the first vector projects onto line T1 in a second tangential direction opposite the first tangential direction.

Rotor brake disc 336 also includes a first surface 378 and a second surface 380. First surface 378 of rotor brake disc 336 ("first disc surface 378") is adjacent to drive slot 364 and may have a common boundary (e.g., a sharp or rounded corner) with first torque face 372. Second disc surface 380 of rotor brake disc 336 ("second disc surface 380") is adjacent to drive slot 364 and may have a common boundary (e.g., a sharp or rounded corner) with second torque face 374. Rotor brake disc 336 may further include a third disc surface 379 on a side of rotor brake disc 336 opposite first disc surface 378, and may include a fourth disc surface 381 on a side of rotor brake disc 336 opposite second disc surface 380. Third surface 379 of rotor brake disc 336 ("third disc surface 379") is adjacent to drive slot 364 and may have a common boundary (e.g., a sharp or rounded corner) with first torque face 372. Fourth surface 381 of rotor brake disc 336 ("fourth disc surface 381") is adjacent to drive slot 364 and may have a common boundary (e.g., a sharp or rounded corner) with second torque face 374. First torque face 372 may be between first disc surface 378 and third disc surface 379, and second torque face 374 may be between second disc surface 380 and fourth disc surface 381. First disc surface 378 and third disc surface 379 may be non-intersecting surfaces of rotor brake disc 336, and may be separated by outer perimeter 362 and/or some portion of rotor brake disc 336. Second disc surface 380 and fourth disc surface 381 may be non-intersecting surfaces of rotor brake disc 336, and may be separated by outer perimeter 362 and/or some portion of rotor brake disc 336.

First disc surface 378, third disc surface 379, second disc surface 380, and/or fourth disc surface 381 may have any suitable orientation relative to the axial A1, radial R1, and tangential T1 directions. In an example, a unit vector n1 extends from and is perpendicular to a portion of first disc surface 378 and a unit vector n2 extends from and is perpendicular to a portion of first torque face 372, and a projection of the unit vector n1 on the line A1 is greater than a projection of the unit vector n2 on the line A1. In some examples, a unit vector n3 (shown in hidden lines) extends from and is perpendicular to a portion of third disc surface 379, and a projection of the unit vector n3 on the line A1 is greater than a projection of the unit vector n2 on the line A1. In an example, a unit vector n4 extends from and is perpendicular to a portion of second 380 and a unit vector n5 (shown in hidden lines) extends from and is perpendicular to a portion of second torque face 374, and a projection of the unit vector n4 on the line A1 is greater than a projection of the unit vector n5 on the line A1. In some examples, a unit vector n6 (shown in hidden lines) extends from and is perpendicular to a portion of fourth disc surface 381, and a projection of the unit vector n6 on the line A1 is greater than a projection of the unit vector n5 on the line A1.

Figure 5:
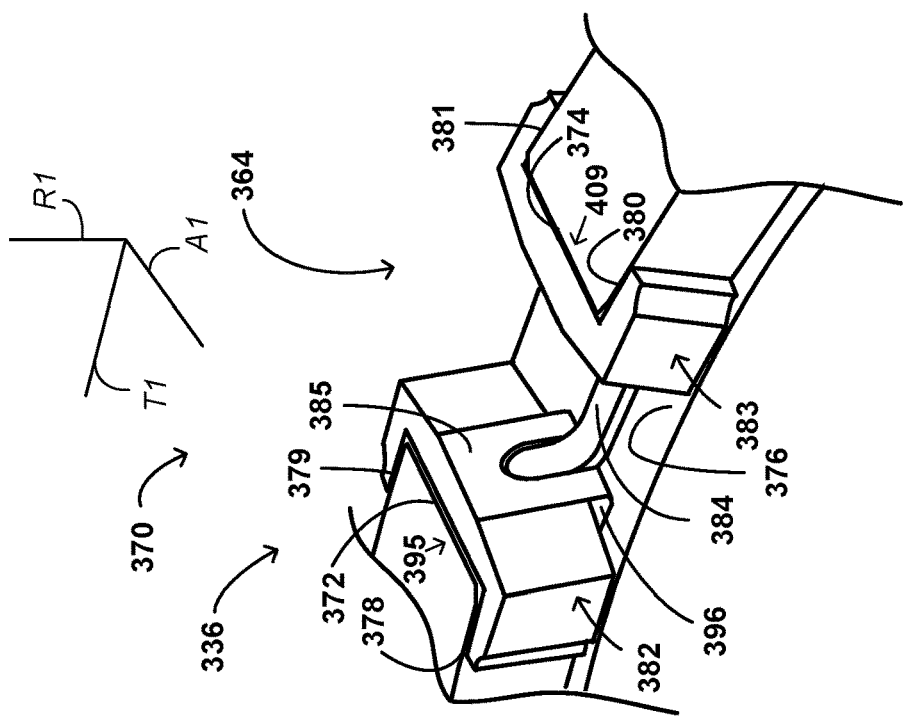
FIG. 5 is an isometric view of an example clip for a drive insert.

FIG. 5 illustrates an example drive insert 370 configured to secure within a drive slot of a brake disc, such as drive slot 364 of rotor brake disc 336. Again, while rotor brake disc 336, drive slot 364, and drive key 340 (FIG. 3) are primarily referred to in the description of FIG. 5 as well as other figures, the description of drive insert 370 may apply to the other drive inserts, brake discs, drive slots, and/or drive keys. Drive insert 370 is configured to install on brake disc 336 such that drive insert 370 is between rotor drive key 340 and drive slot 364 when brake disc 336 is installed on a wheel. Thus, drive insert 370 is between rotor drive key 340 and drive slot 364 when rotor drive key 340 imparts tangential forces to drive slot 364 during braking operations. Drive insert 370 is configured to reinforce drive slot 364 to help reduce any adverse effects to brake disc 336 from rotor drive key 340 imparting forces to drive slot 364 during a braking operation. Drive insert 370 may be configured to provide for secure placement within drive slot 364 in the axial A, radial R, and tangential T directions of rotor brake disc 336, in order to maintain a substantially fixed position relative to drive slot 364 as rotor brake disc 336 rotates.

Drive insert 370 includes a first insert member 382, a second insert member 383, and a bridge member 384. First insert member 382, second insert member 383, and bridge member 384 may function in relationship to each other to secure drive insert 370 into a substantially fixed position relative to rotor brake disc 336 as rotor brake disc 336 experiences movement in tangential, axial, and radial directions during operations of wheel 210 and/or braking assembly 258 (FIG. 2). For example, drive insert 370 is configured such that, when installed within drive slot 364, first insert member 382, second insert member 383, and bridge member 384 interact to secure drive insert 370 against substantial movement in the axial A1, radial R1, and tangential T1 directions of rotor brake disc 336. First insert member 382, second insert member 383, and bridge member 384 may be configured individually and as a group to interact with rotor brake disc 336 in a manner which secures drive insert 370 against rotor brake disc 336, in order to minimize or eliminate substantial movements of drive insert 370 relative to rotor brake disc 336. First insert member 382, second insert member 383, and bridge member 384 may interact with each other and with rotor brake disc 336 to maintain drive insert 370 substantially stationary with respect to rotor brake disc 336 without the use of rivets or other fastening devices which penetrate drive insert 370 and/or rotor brake disc 336.

For example, and as illustrated in FIG. 5, first insert member 382 is configured to position over first disc surface 378, and second insert member 383 is configured to position over second disc surface 380. First insert member 382 is configured to be slidable over first disc surface 378 in a first tangential direction of brake disc 336. Second insert member 383 is configured to be slidable over second disc surface 380 in a second tangential direction substantially opposite the first tangential direction. bridge member 384 is configured to extend from first insert member 382 and second insert member 383 when first insert member 382 is positioned over first disc surface 378 and second insert member 383 is positioned over second disc surface 380 to limit movement of first insert member 382 and second insert member 383 in a tangential direction of brake disc 336.

In some examples, first insert member 382 and/or second insert member 383 are configured to engage a torque face of rotor brake disc 336 in a manner that limits movement of first insert member 382 relative to rotor brake disc 336. For example, as shown in FIG. 5, first insert member 382 may substantially wrap around first torque face 372 and engage an additional surface 379 on an opposite side of rotor brake disc 336, such that some portion of rotor brake disc 336 inserts into a space 395 defined by first insert member 382. The simultaneous engagement of first disc surface 378 and a surface 379 of rotor brake disc 336 axially displaced from first disc surface 378 may act to trap first insert member 382 into a substantially stationary axial position relative to rotor brake disc 336 and limit movement of insert 382 relative to brake disc 336 in the axial direction A1.

Second insert member 383 may be configured in a similar manner, such that second insert member 383 substantially wraps around second torque face 374 and engages another surface 381 on an opposite side of rotor brake disc 336. Thus, in some examples, some portion of rotor brake disc 336 may insert into space 395 defined by first insert member 382, to substantially secure first insert member 382 against axial movements relative to rotor brake disc 336. In some examples, another portion of rotor brake disc 336 may insert into a space 409 defined by second insert member 383, to substantially secure second insert member 383 against axial movements relative to rotor brake disc 336.

In some examples, first insert member 382 and/or second insert member 383 are configured to include one or more additional structural features configured to engage with brake disc 336 in order to help reduce movement between the respective insert member and brake disc 336 in one or more directions. For example, in some examples, first insert member 382 and/or second insert member 383 include an insert lip configured to insert into a recess (or open-ended slot) of rotor brake disc 336 to help limit movement of the respective insert member 382, 383 relative to brake disc 336 in the radial direction R1. For example, first insert member 382 may include insert lip 396, which may extend in a substantially tangential direction T1 of rotor brake disc 336 when first insert member 382 is positioned on rotor brake disc 336. Insert lip 396 is configured to insert in, for example, recess 373 (FIG. 4) defined by brake disc 336, such that recess 373 opposes movement of insert lip 396 and first insert member 382 in a radial direction R1 of rotor brake disc 336. Recess 373 may be configured as an open-ended slot. Thus, insert lip 396 may function to at least partially radially secure first insert member 382 into a substantially fixed radial position relative to rotor brake disc 336 as rotor brake disc 336 experiences movement during operations of wheel 210 and/or braking assembly 258 (FIG. 2).

In some examples, second insert member 383 includes a second insert lip (not shown in FIG. 4) configured to insert into recess 375 defined by brake disc 336, and the second insert lip may function to at least partially radially secure second insert member 383 into a substantially fixed radial position relative to rotor brake disc 336 during operations of wheel 210 and/or braking assembly 258.

When bridge member 384 is inserted between first and second insert members 382, 383 such that bridge member 384 extends between first insert member 382 and second insert member 383, bridge member 384 may act to substantially limit movement of first insert member 382 and/or second insert member 383 in at least a tangential direction T1. Bridge member 384 may contact and/or abut first insert member 382 such that a force on first insert member 382 in a direction toward second insert member 383 is transmitted to bridge member 384, causing bridge member 384 to exert a reaction force on first insert member 382 opposing substantial movement of first insert member 382 in response to the force. Bridge member 384 may contact and/or abut second insert member 383 such that a force on second insert member 383 in a direction toward first insert member 382 transmits to bridge member 384 and causes bridge member 384 to exert a reaction force on second insert member 383, opposing substantial movement of second insert member 383. In some examples, bridge member 384 contacts and/or abuts both first insert member 382 and second insert member 383, such that a force from one of first insert member 382 or second insert member 383 may be transmitted through bridge member 384 to the other of first insert member 382 or second insert member 383.

In some examples, bridge member 384 may be configured to be in compression when bridge member 384 extends between first insert member 382 and second insert member 383. For example, bridge member 384 can be a substantially elastically deforming element (e.g., a spring) which exhibits a change in shape when a compressive force is applied to bridge member 384 (e.g., by first insert member 382 and/or second insert member 383), and which substantially reverses the change in shape when the compressive force is removed. In addition to or instead of including a spring component, in some examples, bridge member 384 is a substantially plastic deforming element which exhibits a substantially irreversible change in shape when a compressive force is applied to bridge member 384 (e.g., by first insert member 382 and/or second insert member 383). The deformations may cause bridge member 384 to exert forces in substantially tangential directions to first insert member 382 and second insert member 383. The forces may press first insert member 382 against first torque face 372 and press second insert member 383 against second torque face 374. Bridge member 384 may thereby establish and maintain a contact pressure between first insert member 382 and first torque face 372, and establish and maintain a contact pressure between second insert member 383 and second torque face 374. The substantially tangential bridge member 384 forces and resulting contact pressures applied by bridge member 384 may act to substantially maintain first insert member 382 and second insert member 383 engaged with opposite sides of rotor brake disc 336, as well as limiting movement of first insert member 382 and second insert member 383 in tangential directions T1 of rotor brake disc 336. Thus, first insert member 382, second insert member 383, and bridge member 384 may functionally interact in a manner which axially and tangentially secures drive insert 370 into a substantially fixed position relative to rotor brake disc 336 as rotor brake disc 336 experiences movement in the tangential and axial directions during operations of wheel 210 and/or braking assembly 258 (FIG. 2).

Figure 6:
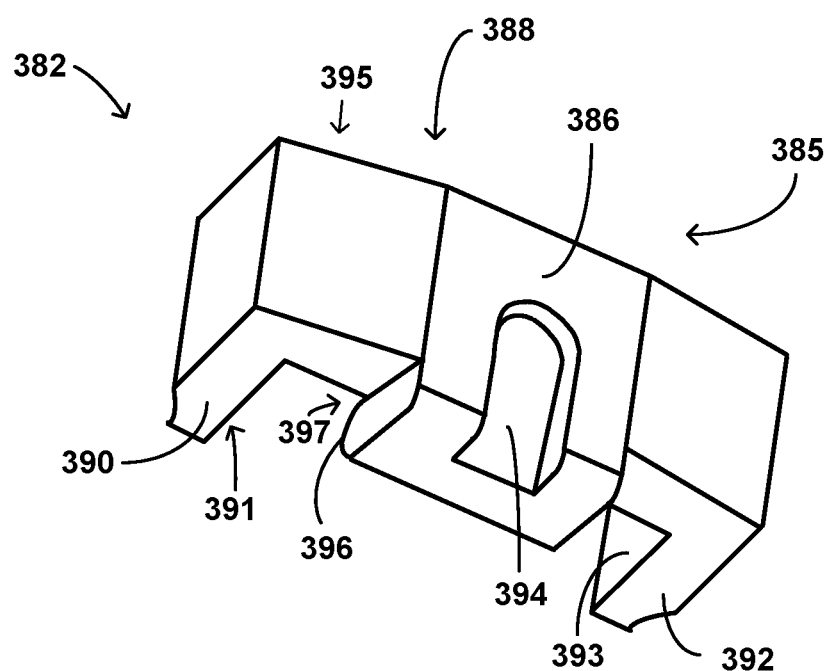
FIG. 6 is an isometric view of an example first insert member of the drive insert of FIG. 5.

FIG. 6 illustrates first insert member 382, which includes a body section 385 and tabs 390, 392 extending from body section 385. Body section 385 is configured to reside between rotor brake disc 336 and rotor drive key 340 when first insert member 382 is installed on rotor brake disc 336 (e.g., positioned over first disc surface 378) and rotor drive key 340 extends through drive slot 364 in the axial direction A1 of rotor brake disc 336. Thus, body section 385 is configured to be between rotor drive key 340 and drive slot 364 when rotor drive key 340 imparts tangential forces to first torque face 372 during braking operations. First insert member 382 may include space 395 configured to receive a portion of rotor brake disc 336.

Body section 385 is configured to protect rotor brake disc 336 against, for example, the mechanical stresses generated when friction surface 368 (FIG. 3) of rotor brake disc 336 contacts a friction surface of one or more adjacent brake discs during braking operations. Body section 385 may be configured to distribute a load from rotor drive key 340 to first torque face 372 when braking operations generate a torque on rotor brake disc 336 and/or to reduce wear on brake disc 336. Body section 385 may protect first torque face 372 against, for example, mechanical stresses generated when rotor drive key 340 reacts against body section 385 as a result of a torque generated by rotor brake disc 336 in a tangential direction T1 of rotor brake disc 336. Body section 385 may at least partially cover first torque face 372 of rotor brake disc 336 when first insert member 382 is positioned over first disc surface 378.

Figure 7C:
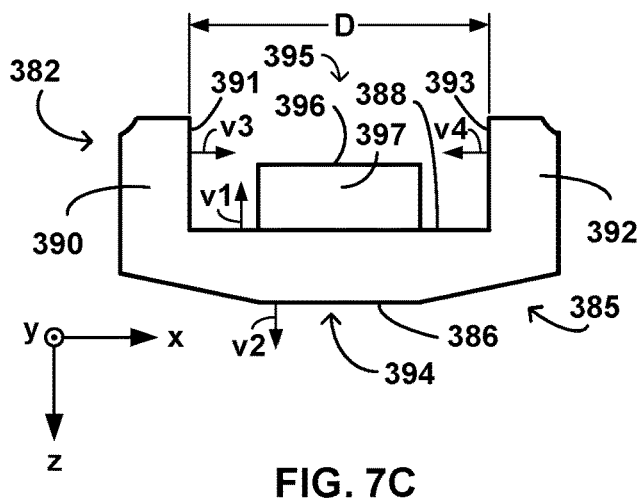
FIG. 7C is a top elevation view of the example first insert member of FIG. 7A.
Figure 7A:
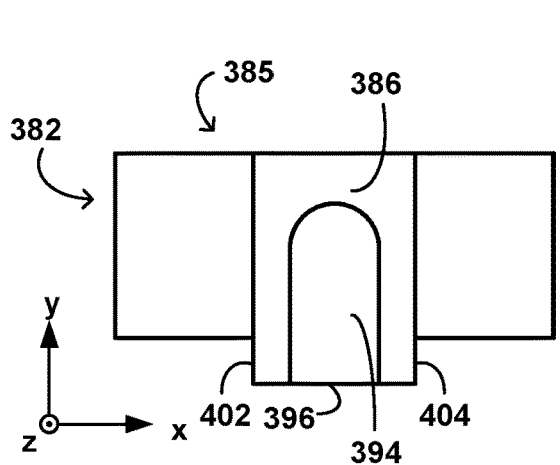
FIG. 7A is a front elevation view of an example first insert member.
Figure 7B:
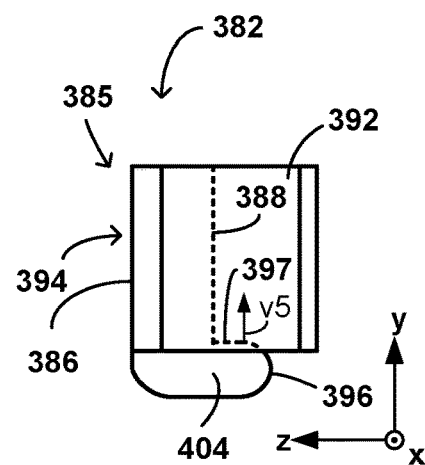
FIG. 7B is a right-side view of the example first insert member of FIG. 7A.
Figure 7D:
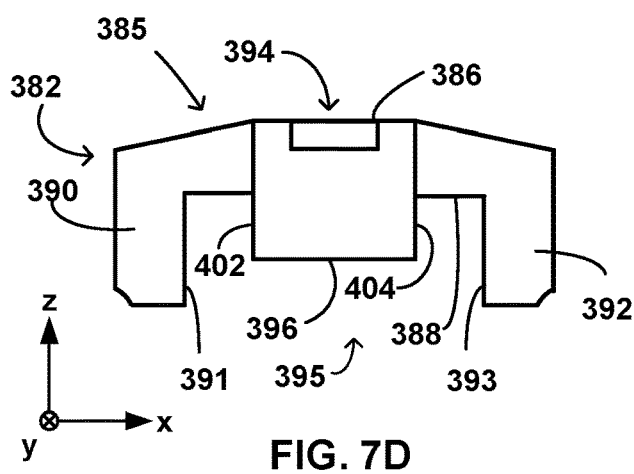
FIG. 7D is a bottom elevation view of the example first insert member of FIG. 7A.

FIGS. 7A-7D provide additional illustrations of first insert member 382, with FIG. 7A providing a front view, FIG. 7B providing a side view, FIG. 7C providing a top view, and FIG. 7D providing a bottom view. Each of FIGS. 7A-7D is oriented with respect to the x-y-z axes shown. In FIGS. 7A-7D, positive directions along each of the x-y-z axes are represented by the direction of each axis arrow, with a circled dot indicating a direction out of the page and a circled x indicating a direction into the page.

Body section 385 includes a drive face 386 and a back face 388. Drive face 386 and back face 388 may be on substantially opposite sides on body section 385. Back face 388 is configured to engage (e.g., contact and/or frictionally engage) first torque face 372 of brake disc 336 when first insert member 382 is positioned over first disc surface 378. Back face 388 may be configured to bear on first torque face 372 when rotor drive key 340 generates a reaction force on body section 385 against the tangential torques produced by rotor brake disc 336 during braking operations. In examples, back face 388 defines a displacement in at least the axial direction A1 and the radial direction R1 of rotor brake disc 336 when first insert member 382 is positioned over first disc surface 378.

Back face 388 may be configured to contact first torque face 372 of brake disc 336 when a portion of rotor brake disc 336 inserts into space 395 defined by first insert member 382, as discussed above. In an example, back face 388 is configured to substantially face first torque face 372, such that when first insert member 382 is positioned over first disc surface 378, a first vector from back face 388 toward first torque face 372 projects onto line T1 in a first tangential direction, and a second vector from first torque face 372 toward back face 388 and parallel to the first vector projects onto line T1 in a second tangential direction opposite the first tangential direction.

Back face 388 defines a contact area with first torque face 372 of brake disc 336 when first insert member 382 is installed on rotor brake disc 336 and a force in a direction from drive face 386 to back face 388 is exerted against body section 385. In some examples, back face 388 is configured such that, when bridge member 384 acts to apply a force to body section 385 in a direction from drive face 386 to back face 388 (e.g., due to a deformation of bridge member 384, or another reason), the force presses back face 388 against first torque face 372 to establish a contact pressure between back face 388 and first torque face 372. The contact pressure may act in a direction from a first pressure area on back face 388 to a second pressure area on first torque face 372. For example, the force may result from bridge member 384 in compression and extending between first insert member 382 and second insert member 383. The first pressure area and/or the second pressure area define a displacement in at least the axial direction A1 and the radial direction R1 of rotor brake disc 336. This contact pressure may assist in establishing first insert member 382 in a substantially stationary axial A1, radial R1, and tangential T1 positions relative to rotor brake disc 336 during operations of wheel and brake assembly 215 (FIG. 2).

As illustrated at FIGS. 7A-7D, when first insert member 382 is oriented in accordance with the x-y-z axes shown, a projection of back face 388 onto a x-y plane defined by the x-axis and the y-axis may define a displacement along the x-axis and a displacement along the y-axis to, for example, provide engagement with first torque face 372. A vector v1 (FIG. 7C) extending from a surface of back face 388 in a direction away from body section 385 may have at least a z-axis component, with the z-axis component having a direction in the negative direction of the z-axis illustrated (e.g., a direction opposite the z-axis arrow illustrated). Vector v1 may be a normal vector to some portion of back face 388. Back face 388 is illustrated in FIG. 7B with a hidden line.

Body section 385 further includes a drive face 386. Drive face 386 may reside on a side of body section 385 opposite back face 388. Drive face 386 is configured to engage (e.g., contact or frictionally engage) rotor drive key 340 (FIG. 3) when back face 388 engages first torque face 372 and rotor drive key 340 extends through drive slot 364, 366. Drive face 386 may provide a sliding and a bearing surface to act against rotor drive key 340 to minimize or possibly eliminate direct engagement between rotor drive key 340 and a surface of rotor brake disc 336 during operations of wheel and brake assembly 215. The mitigation of direct engagement between rotor drive key 340 and rotor brake disc 336 may act to distribute load imparted to rotor brake disc 336 and assist in preserving the structural integrity of rotor brake disc 336, particularly in the areas in the neighborhood of, e.g., around and adjacent to, drive slot 364.

Drive face 386 may include a sliding surface configured to establish a low coefficient of friction between drive face 386 and rotor drive key 340, in order to minimize shear stresses and heat generation when rotor brake disc 336 slidably translates over rotor drive key 340 during braking operations, as previously discussed. The sliding surface may comprise a particular material, have a particular surface coating, be machined in a certain manner (e.g., polished) and/or have some other attribute lending itself to wear resistance and/or lower friction coefficients. In some examples, the sliding surface may have a nitride coating. In examples, drive face 386 defines a displacement in at least the axial direction A1 and the radial direction R1 of rotor brake disc 336 when first insert member 382 is positioned over first disc surface 378. Drive face 386 may be configured to substantially face rotor drive key 340 when rotor drive key 340 extends through drive slot 364, 366 and back face 388 engages first torque face 372.

As illustrated at FIGS. 7A-7D, when first insert member 382 is oriented in accordance with the x-y-z axes shown, a projection of drive face 386 onto a x-y plane defined by the x-axis and the y-axis may define a displacement along the x-axis and a displacement along the y-axis. A vector v2 (FIG. 7C) extending from a surface of drive face 386 in a direction away from body section 385 may have at least a z-axis component, with the z-axis component having a direction in the positive direction of the z-axis illustrated (e.g., a direction the same as the z-axis arrow illustrated). Vector v2 may be a normal vector to some portion of drive face 386. In examples, vector v2 is parallel to vector v1 and has a direction opposite vector v1.

First insert member 382 may be configured to engage (e.g., contact and/or frictionally engage) rotor brake disc 336 in a manner which substantially constrains movement of first insert member 382 in at least an axial direction A1 of rotor brake disc 336. For example, first insert member 382 may further include at least a first tab 390, and may also comprise a second tab 392, with first tab 390 and second tab 392 extending from body section 385 and, in some examples, on opposite sides of body section 385. First tab 390 and second tab 392 may be configured to engage (e.g., contact and/or frictionally engage) opposite sides of rotor disc 336 when back face 388 engages first torque face 372 of rotor brake disc 336. First tab 390 and/or second tab 392 may be configured to engage the respective sides of rotor brake disc 336 (e.g., surfaces 378, 379, respectively, shown in FIG. 4) in a manner which substantially secures first insert member 382 against movement in the axial direction A1 relative to rotor brake disc 336.

First tab 390 and/or second tab 392 may extend from body section 385 in a direction substantially parallel to the tangential direction T1 of rotor brake disc 336 when back face 388 engages first torque face 372 of rotor brake disc 336. As illustrated at FIGS. 7A-7D, when first insert member 382 is oriented in accordance with the x-y-z axes shown, first tab 390 and/or second tab 392 may extend away from body section 385 in the negative direction of the z-axis illustrated.

First tab 390, second tab 392, and body section 385 may collectively define space 395 configured to receive some portion of rotor brake disc 336 when first insert member 382 is positioned on rotor brake disc 336, such that the portion of rotor brake disc 336 substantially inserts into space 395. In some examples, first tab 390 and second tab 392 extend in substantially parallel directions from body section 385. First tab 390 and/or second tab 392 may have one or more common boundaries (e.g., a sharp or rounded corner) with body section 385. For example, first tab 390 may form a common boundary with some portion of back face 388, and may form another common boundary with some portion of drive face 386. Second tab 392 may form at least one common boundary with some portion of back face 388, and may form an additional common boundary with some portion of drive face 386.

First insert member 382 may include a first insert surface 391 and a second insert surface 393 configured to engage opposite sides of rotor brake disc 336, in order to substantially secure first insert member 382 against movement in the axial direction A1 relative to rotor brake disc 336. For example, first insert member 382 may be configured to provide a slip fit (e.g., minimal assembly friction) between first insert surface 391 and a first side of rotor brake disc 336 (e.g., first disc surface 378 shown in FIG. 4), and may be configured to provide a slip fit between second insert surface 393 and a second side of rotor brake disc 336 (e.g., third disc surface 379 shown in FIG. 4).

For example, FIGS. 6, 7C, and 7D illustrate first tab 390 having first insert surface 391. First insert surface 391 is configured to engage (e.g., contact and/or frictionally engage) first disc surface 378 when back face 388 engages first torque face 372 of brake disc 336. In some examples, first insert surface 391 extends from body section 385 in a direction substantially parallel to the tangential direction T1 of rotor brake disc 336. First insert surface 391 is configured to substantially face some portion of first disc surface 378 of rotor brake disc 336. First insert surface 391 may substantially prevent movement of first insert member 382 in a direction from first inner surface 391 toward first disc surface 378. In examples, first insert surface 391 defines a displacement in at least the radial direction R1 and the tangential direction T1 of rotor brake disc 336 when first insert member 382 is positioned over first disc surface 378.

First insert surface 391 may be configured such that, when first insert member 382 is positioned over first disc surface 378, first insert surface 391 and first disc surface 378 substantially face each other, such that a vector from first insert surface 391 toward first disc surface 378 projects onto line A1 in a first axial direction, and a vector from first disc surface 378 toward first insert surface 391 projects onto line A1 in a second axial direction opposite the first axial direction.

As further illustrated at FIGS. 6, 7C, and 7D, second tab 392 of first insert member 382 may include a second insert surface 393 configured to engage (e.g., contact and/or frictionally engage) third disc surface 379 when back face 388 engages first torque face 372. Second insert surface 393 may extend from body section 385 in a direction substantially parallel to the tangential direction T1 of rotor brake disc 336, and may be configured to substantially face some portion of third disc surface 379 in order to substantially prevent movement of first insert member 382 in a direction from second insert surface 393 toward third disc surface 379. Second insert surface 393 may define a displacement in at least the radial direction R1 and the tangential direction T1 of rotor brake disc 336 when first insert member 382 is positioned on rotor brake disc 336.

Second insert surface 393 may be configured such that, when first insert member 382 is positioned on rotor brake disc 336, second insert surface 393 and third disc surface 379 (FIG. 4, 5) substantially face each other, such that a vector from second insert surface 393 toward third disc surface 379 projects onto line A1 in a first axial direction and a vector from third disc surface 379 toward second insert surface 393 projects onto line A1 in a second axial direction opposite the first axial direction. In some examples, first insert member 382 is configured such that first insert surface 391 and second insert surface 393 substantially face each other, such that a vector from first insert surface 391 toward second insert surface 393 projects onto line A1 in a first axial direction and a vector from second insert surface 393 toward first insert surface 391 projects onto line A1 in a second axial direction opposite the first axial direction.

As illustrated at FIGS. 7A-7D, when first insert member 382 is oriented in accordance with the x-y-z axes shown, a projection of first insert surface 391 onto a y-z plane defined by the y-axis and the z-axis may define a displacement along the y-axis and a displacement along the z-axis. A vector v3 (FIG. 7C) extending from first insert surface 391 in a direction away from first tab 390 may have at least an x-axis component, with the x-axis component having a direction in the positive direction of the x-axis illustrated (e.g., a direction the same as the x-axis arrow illustrated). Vector v3 may be a normal vector to some portion of first insert surface 391. In an example, when vector v3 extends from first insert surface 391 and intersects second tab 392, and when vector v1 extends from back face 388 and does not intersect first tab 390 or second tab 392, a projection of v3 onto the z-axis is less than a projection of v1 onto the z-axis.

As further illustrated at FIGS. 7A-7D, when first insert member 382 is oriented in accordance with the x-y-z axes shown, a projection of second insert surface 393 onto a y-z plane defined by the y-axis and the z-axis may define a displacement along the y-axis and a displacement along the z-axis. A vector v4 (FIG. 7C) extending from second insert surface 393 in a direction away from second tab 392 may have at least an x-axis component, with the x-axis component having a direction in the negative direction of the x-axis illustrated (e.g., a direction opposite the x-axis arrow illustrated). Vector v4 may be a normal vector to some portion of second insert surface 393. Vector v4 may be perpendicular to vector v1. Vector v4 may be parallel to vector v3 and have a direction opposite vector v3. In an example, when vector v4 extends from second insert surface 393 and intersects first tab 390, and when vector v1 extends from back face 388 and does not intersect first tab 390 or second tab 392, a projection of v4 onto the z-axis is less than a projection of v1 onto the z-axis.

First insert member 382 may define space 395 (FIG. 7C) between first insert surface 391 and second insert surface 393. Space 395 may be configured to receive a portion of rotor brake disc 336, e.g., mate with a part of brake disc 336 adjacent to drive slot 364 (FIG. 4). When first insert member 382 is oriented in accordance with the x-y-z axes shown, space 395 may define a displacement D parallel to the x-axis. The displacement D of space 395 may vary with respect to the y-axis, and/or the z-axis. For example, the displacement D may increase or decrease in a positive direction of the y axis and increase or decrease in a negative direction of the y axis, and may increase or decrease in a positive direction of the z axis and increase or decrease in a negative direction of the z axis. In some examples, first insert member 382 may be configured such that a displacement D dovetails and/or substantially conforms with the portion of rotor brake disc 336 when first insert member 382 receives the portion of rotor brake disc 336. For example, first insert surface 391 and second insert surface 393 may be configured to slant away from each other, such that the displacement D increases in a positive direction of the y-axis (e.g., increases in a radial direction from central aperture 360 to perimeter 362 (FIG. 3) when first insert member is positioned on rotor brake disc 336). Rotor brake disc 336 may be configured such that the increasing displacement D dovetails with rotor brake disc 336 to, for example, substantially secure movement of first insert member 382 in the radial direction from central aperture 360 to perimeter 362 (FIG. 3). In some examples, the displacement D may be substantially constant with respect to the y-axis, and/or the z-axis.

First insert member 382 may thus be configured such that first insert surface 391 and second insert surface 393 substantially bracket a portion of rotor brake disc 336 when first insert member 382 is positioned on rotor brake disc 336, and back face 388 engages first torque face 372 of rotor brake disc 336. The bracketing of rotor brake disc 336 may help secure first insert member 382 against movement in an axial direction A1 relative to rotor brake disc 336 during operations of wheel and brake assembly 215 (FIG. 2). For example, the bracketing of rotor brake disc 336 by first insert surface 391 and second insert surface 393 may provide axial support to first insert member 382 when rotor drive key 340 exerts force on drive face 386 in the tangential direction T1, the axial direction A1, and/or the radial direction R1 during braking operations.

In some examples, rather than or in addition to first tab 390 and/or second tab 392, first insert member 382 and brake disc 336 may include interlocking or otherwise engageable components configured to reduce relative movement of first insert member 382 and brake disc 336. For example, first insert member 382 may include a mating protrusion configured to insert or slidably translate into a mating recess defined by rotor brake disc 336 when first insert member 382 is positioned on rotor brake disc 336. As another example, first insert member 382 may define a mating recess configured to receive a mating protrusion of rotor brake disc 336 when first insert member 382 is positioned on rotor brake disc 336. The mating protrusion and/or mating recess may be configured to engage (e.g., contact and/or frictionally engage) when first insert member 382 is positioned on rotor brake disc, in order to limit at least movement in the axial direction A1 of first inert member 382 relative to rotor brake disc 336. When body section 385 is oriented in accordance with the x-y-z axes shown in FIGS. 7A-7D, a mating protrusion defined by first insert member 382 may extend from back face 388 in a negative direction of the z-axis. A mating recess defined by first insert member 382 may extend from back face 388 into body section 385, and may be configured to accommodate a protrusion extending from first torque face 372 (FIG. 4) of brake disc 336 in a tangential direction T1 of rotor brake disc 336.

In some examples, first insert member 382 is further configured to include an insert lip 396 that is configured to insert into a recess 373 (FIG. 4) of rotor brake disc 336 to at least partially secure first insert member 382 into a substantially fixed radial position relative to rotor brake disc 336 as rotor brake disc 336 experiences movement during operations of wheel 210 and/or braking assembly 258 (FIG. 2). Insert lip 396 may be in addition to a mating protrusion of first insert member 382 discussed above. Insert lip 396 extends away from body section 385. Insert lip 396 may form a common boundary with back face 388, and may reside at least partially between first tab 390 and second tab 392. Insert lip 396 may extend (e.g., protrude) from body section 385 in substantially the same direction as first tab 390 and/or second tab 392. When first inert member 382 is positioned on rotor brake disc 336, insert lip 396 may extend in a substantially tangential direction T1 of rotor brake disc 336.

Insert lip 396 may insert into recess 373 defined by brake disc 336 when back face 388 engages first torque face 372 of rotor brake disc 336. Bridge member 384 may act to partially secure insert lip 396 within recess 373 when bridge member 384 applies a force to body section 385 in a direction from drive face 386 to back face 388. Thus, insert lip 396 may function to provide a measure of support to first insert member 382 in the radial direction R1. Insert lip 396 has any suitable configuration. In some examples, insert lip 396 may include one or more rounded corners or surfaces, which may reduce stress concentrations on insert lip 396 during operations and braking of wheel 210 and/or braking assembly 258 (FIG. 2) relative to more sharp corners or surfaces.

Insert lip 396 is configured to substantially face some portion of recess 373 when insert lip 396 is inserted into recess 373, in order to substantially limit movement of first insert member 382 in a radial direction of rotor brake disc 336. In examples, insert lip 396 defines a displacement in at least the tangential direction T1 and the axial direction A1 of rotor brake disc 336 when first insert member 382 is positioned over first disc surface 378 and insert lip 396 is inserted into recess 373. Insert lip 396 may be configured such that, when first insert member 382 is positioned over first disc surface 378, some portion of insert lip 396 and some portion of recess 373 substantially face each other, such that a vector from a surface of insert lip 396 toward a surface of recess 373 projects onto line R1 in a first radial direction, and a vector from the surface of recess 373 toward the surface of insert lip 396 projects onto line R1 in a second radial direction opposite the first radial direction. For example, first insert member 382 may be configured such that a lip bearing surface 397 of insert lip 396 substantially faces recess bearing surface 371 of recess 373 (FIG. 4) when first insert member 382 is positioned over first disc surface 378.

As illustrated in FIGS. 7C and 7B, with first insert member 382 oriented in accordance with the x-y-z axes shown, insert lip 396 may extend from body section 385 in a negative direction of the z-axis. Insert lip 396 may reside at least partially within the space 395 between first insert surface 391 and second insert surface 393, and may extend from any portion of body section 385. For example, insert lip 396 may extend from body section 385 at a more positive location on the y-axis than that depicted at FIG. 7B. Insert lip 396 may extend from body section 385 at any location on the x-axis or the z-axis. Insert lip 396 defines a lip bearing surface 397 that is configured such that a projection of lip bearing surface 397 onto an x-z plane defined by the x-axis and the z-axis may define a displacement along the x-axis and a displacement along the z-axis. A vector v5 (FIG. 7B) extending from lip bearing surface 397 in a direction away from insert lip 396 may have at least a y-axis component, with the y-axis component having a direction in the positive direction of the y-axis illustrated (e.g., a direction the same as the y-axis arrow illustrated). Vector v5 may be a normal vector to some portion of lip bearing surface 397.

Insert lip 396 may share a common boundary (e.g., a sharp or rounded corner) with back face 388. Insert lip may be oriented with respect to back face 388 such that, when vector v5 extends from lip bearing surface 397 and does not intersect back face 388, and when vector v1 extends from back face 388 and does not intersect first tab 390 or second tab 392, a projection of v5 onto the z-axis is less than a projection of v1 onto the z-axis. Insert lip 396 may be oriented with respect to first tab 390 such that, when vector v5 extends from lip bearing surface 397 and does not intersect first tab 390 or second tab 392, and when vector v3 extends from first insert surface 391 and intersects second insert surface 393, a projection of v5 onto the x-axis is less than a projection of vector v3 onto the x-axis. Insert lip 396 may be oriented with respect to second tab 392 such that, when vector v5 extends from lip retaining surface 397 and does not intersect first tab 390 or second tab 392, and when vector v4 extends from second insert surface 393 and intersects first insert surface 391, a projection of v5 onto the x-axis is less than a projection of vector v4 onto the x-axis.

Insert lip 396 may be configured to provide a measure of axial support to first insert member when insert lip 396 is inserted into recess 373. For example, insert lip 396 may include first side surface 402 configured to oppose a surface of brake disc 336 defining recess 373, such that first side surface 402 substantially constrains movement of first insert member 382 in an axial direction A1 of rotor brake disc 336. First side surface 402 may be configured to engage (e.g., contact and/or frictionally engage) the surface of brake disc 336 defining recess 373 when insert lip is inserted into recess 373. First side surface 402 and recess 373 may substantially face each other when insert lip 396 is inserted into recess 373, such that a first vector from first side surface 402 toward recess 373 projects onto line A1 in a first axial direction, and a second vector from recess 373 toward first side surface 402 and parallel to the first vector projects onto line A1 in a second axial direction opposite the first axial direction.

Insert lip 396 may further include second side surface 404 on a substantially opposite side of insert lip 396 from first side surface 402. In some examples, second side surface 404 may be configured to oppose a second surface of recess 373, and may substantially constrain movement of first insert member 382 in a direction opposite the axial direction constrained by first side surface 402. Second side surface 404 may be configured to engage (e.g., contact and/or frictionally engage) a second surface of brake disc 336 defining recess 373 when insert lip is inserted into recess 373. Second side surface 404 and recess 373 may substantially face each other when insert lip 396 is inserted into recess 373, such that a first vector from second side surface 404 toward recess 373 projects onto line A1 in a first axial direction, and a second vector from recess 373 toward second side surface 404 and parallel to the first vector projects onto line A1 in a second axial direction opposite the first axial direction. As illustrated at FIGS. 7A-7D, when first insert member 382 is oriented in accordance with the x-y-z axes shown, a projection of first side surface 402 or a projection of second side surface 404 onto the y-z plane may define a displacement along the y-axis and a displacement along the z-axis.

First insert member 382 may thus be secured against movements in the radial R1, axial A1, and tangential T1 directions of rotor brake disc 336 without the necessity for additional attachment mechanisms penetrating rotor brake disc 336. Insert lip 396 may function to provide support against substantial movement of first insert member 382 in the radial direction R1 relative to rotor brake disc 336. First insert surface 391 and second insert surface 393 may bracket a portion of rotor brake disc 336 to provide support against substantial movement of first insert member 382 in the axial direction A1 relative to rotor brake disc 336. Bridge member 384 may act to substantially limit movement of first insert member 382 and/or second insert member 383 in at least a tangential direction T1. Bridge member 384 may provide a force on body section 385 in a direction from drive face 386 to back face 388 to provide support against substantial movement of first insert member 382 in the tangential direction T1 relative to rotor brake disc 336. This radial, axial, and tangential support may allow secure placement of first insert member 382 on rotor brake disc 336 in the absence of rivets or other fastening mechanisms penetrating rotor brake disc 336. The radial, axial, and tangential support of first insert member 382 when positioned on rotor brake disc 336 may be present in the absence of an extra attachment device (e.g., a rivet) penetrating first inert member 382 and/or rotor brake disc 336.

First insert member 382 can have any suitable configuration. In some examples, body section 385, first tab 390, and second tab 392 are formed to be physically separate from each other and subsequently attached to define first insert member 382. In other examples, body section 385, first tab 390, and second tab 392 have a unitary body construction, e.g., are formed to be one piece. First insert member 382 may be formed by machining out of bar stock, investment casting, 3D printing, or some other suitable method. Further, in some examples, first insert member 382 can be formed from any suitable materials, such as, but not limited to, 17-4PH stainless steel, Inconel or other alloys. In some examples, first insert member 382 includes a wear-resistant coating, such as but not limited to a nitride coating. In some examples, body section 385, first tab 390, and second tab 392 are formed from the same material, while in other examples, at least two of body section 385, first tab 390, and second tab 392 are formed from different materials from each other.

Figure 8:
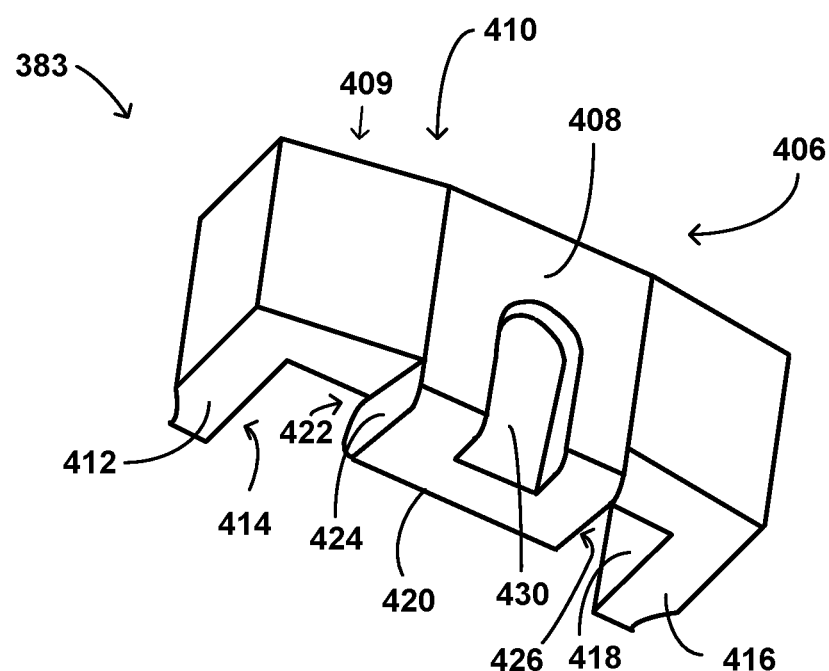
FIG. 8 is an isometric view of an example second insert member of the drive insert of FIG. 5.

FIG. 8 illustrates a perspective view of an example second insert member 383. Second insert member 383 may include at least a body section 406, a drive face 408, a space 409, a back face 410 (e.g., facing an opposite direction from drive face 408), a first tab 412, a first insert surface 414, a second tab 416, a second insert surface 418, and an insert lip 420 defining a first side surface 424, a second side surface 426, and a lip bearing surface 422, which may be configured similarly to and relation to each other in the same manner as described above for like-named components of first insert member 382. Second insert member 383 may interact with rotor drive key 340, second torque face 374, second disc surface 380, fourth disc surface 381, recess 375, and recess bearing surface 377 of rotor brake disc 336 in manners similar to the interactions of first insert member 382 with rotor drive key 340, first torque face 372, first disc surface 378, third disc surface 379, recess 373, and recess bearing surface 371.

As discussed, and as illustrated in FIG. 5, drive insert 370 includes first insert member 382, second insert member 383, and bridge member 384. First insert member 382 is configured to be slidable over first disc surface 378 and third disc surface 379 in a first tangential direction of rotor brake disc 336. Second insert member 383 is configured to be slidable over second disc surface 380 and fourth disc surface 381 in a second tangential direction of rotor brake disc 336, where the second tangential direction may be substantially opposite the first tangential direction. Bridge member 384 is configured to extend from first insert member 382 to second insert member 383 when first insert member 382 is positioned over first disc surface 378 and second insert member 383 is positioned over second disc surface 380, to at least in part limit movement of first insert member 382 and second insert member 383 in a tangential direction of the brake disc.

Bridge member 384 may have any suitable shape that enables bridge member 384 to contact and/or abut first insert member 382 and second insert member 383. For example, bridge member 384 may comprise a straight beam, a bent beam (e.g., a beam having a V-shape, a U-shape, an undulating shape, and the like), a helical element, or other shapes. Bridge member 384 may include an elongated base extending between a first end configured to contact and/or abut first insert member 382 and a second end configured to contact and/or abut second insert member 383. In some examples, bridge member 384, first insert member 382, and/or second member 383 may be configured to provide an engineering fit between bridge member 384 and first insert member 382 and/or second insert member 383, such as a sliding fit, a locational fit, a transitional fit, or an interference fit. In addition to or instead of the engineering fit, in some examples, bridge member 384 may be attached to first insert member 382 and/or second insert member 383 using any suitable technique, such as, but not limited to, adhesives, fusion, friction, or welding or soldering. The attachment may be substantially permanent, or, alternatively, may be configured to enable separation of bridge member 384, first insert member 382, and/or second insert member 383, such that bridge member 384, first insert member 382, and/or second insert member 383 remain usable upon separation.

In some examples, bridge member 384 is configured such that a force applied to bridge member 384 (e.g. applied by an operator) and driving bridge member 384 between first insert member 382 and second insert member 383 causes bridge member 384 to deform (e.g., elastic and/or plastic deformation) when bridge member 384 contacts and/or abuts first element 382 and second element 383. For example, bridge member 384 may be a substantially elastically deforming element (e.g., a spring) which exhibits a change in shape when a compressive force is applied to bridge member 384 (e.g., by first insert member 382 and/or second insert member 383), and which substantially reverses the change in shape when the compressive force is removed. When bridge member 384 is a substantially elastic element and is compressed between first insert member 382 at its first end and second insert member 383 at its second end, the elasticity of bridge member 384 causes the first end of bridge member 384 to push back against first insert member 382 and/or the second end of bridge member 384 to push back against second insert member 383.

In other examples, bridge member 384 is a substantially plastic deforming element which exhibits a substantially irreversible change in shape when a compressive force is applied to bridge member 384 (e.g., by first insert member 382 and/or second insert member 383). When bridge member 384 is a substantially plastic deforming element, bridge member 384 may retain some degree of elasticity when plastically deformed, such that when bridge member 384 is compressed between first insert member 382 at its first end and second insert member 383 at its second end, the retained elasticity of bridge member 384 causes the first end of bridge member 384 to push back against first insert member 382 and/or the second end of bridge member 384 to push back against second insert member 383. In examples, when bridge member 384 is a substantially plastic deforming element and bridge member 384 extends from first insert member 382 to second insert member 383, a material comprising bridge member 384 (e.g., comprising base section 401(FIG. 9)) is in the plastic deforming region of a stress-strain curve for the material.

Bridge member 450 is a substantially plastically deforming member configured to retain some degree of elasticity when plastically deformed, such that when bridge member 450 is compressed between first insert member 382 and second insert member 383, the retained elasticity of bridge member 450 causes member first end 452 to push back against first insert member 382 and/or member second end 454 to push back against second insert member 383. In some examples, bridge member 450 exhibits a substantially irreversible change in shape when an installation force (e.g., a compressive force) is applied to bridge member 450 (e.g., by first insert member 382, second insert member 383, an installing operator, or some other source).

Bridge member 384 may be formed by machining out of bar stock, investment casting, 3D printing, or some other suitable method. Further, in some examples, bridge member 384 can be formed from any suitable materials, such as, but not limited to, Inconel X-750, 17-7PH stainless steel, or other alloys. Bridge member 384 may be formed from a material providing good strength at temperature, good creep resistance, high ductility during forming, and sufficient yield during installation to minimize the effect of tolerances on force require during bridge member 384 installation.

In some examples, bridge member 384 includes a first end 387 ("bridge first end 387") (FIG. 9) configured to insert into a recess defined by first insert member 382, and includes a second end 389 ("bridge second end 389") (FIG. 9) configured to insert into a recess defined by second insert member 383. For example, first insert member 382 may define a bridge slot 394 (FIG. 6) configured to receive bridge first end 387 and/or second insert member 383 may define a bridge slot 430 (FIG. 8) configured to receive bridge second end 389. Bridge slots 394, 430 may be a recessed section of the respective body sections 385, 406, such as a recessed section of drive face 386 of body section 385. Bridge member 384 may include a base section 401 between bridge first end 387 and bridge second end 389.

Figure 9:
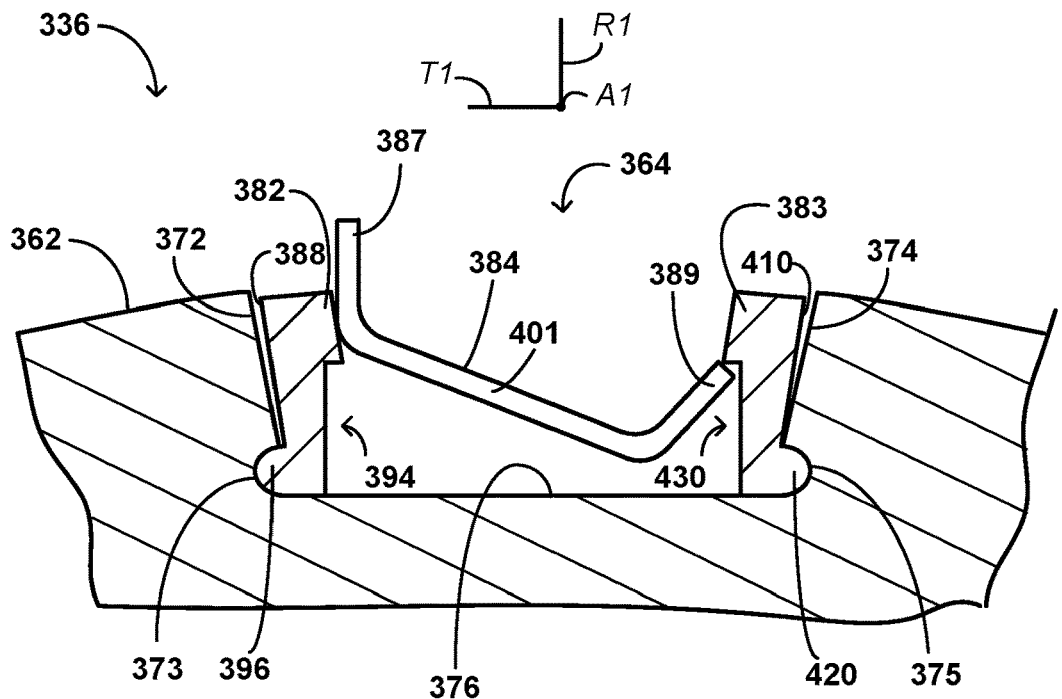
FIG. 9 is cross-section plan view of an example brake disc, an example first insert member, an example second insert member, and an example bridge member, where the cross-section is taken in a direction perpendicular to an axis of rotation of the brake disc.

FIG. 9 illustrates bridge member 384 during an example assembly technique, as bridge member 384 is being placed between first insert member 382 and second insert member 383. FIG. 9 illustrates a cross-section of rotor brake disc 336, first insert member 382, and second insert member 383 taken with a cutting plane substantially perpendicular to axial direction A1 of FIGS. 4 and 5. Radial direction R1, tangential direction T1, and axial direction A1 of rotor brake disc are depicted for reference, with axial direction A1 perpendicular to the page. First insert member 382 includes at least bridge slot 394 ("first member bridge slot 394"), insert lip 396 ("first member insert lip 396"), and back face 388 ("first member back face 388"). Second insert member 383 includes at least bridge slot 430 ("second member bridge slot 430"), insert lip 420 ("second member insert lip 420"), and back face 410 ("second member back face 410"). In FIG. 9, first member back face 388 is facing first torque face 372 of drive slot 364, and second member back face 410 is facing second torque face 374 of drive slot 364. First member insert lip 396 is inserted into recess 373 of drive slot 364, which is on the outer perimeter 362 of rotor brake disc 336. Second member insert lip 420 is inserted into recess 375 of drive slot 364. As depicted in FIG. 9, bridge second end 389 is partially inserted within second member bridge slot 430, with bridge member 384 in a relaxed, substantially zero-stress configuration.

Figure 10:
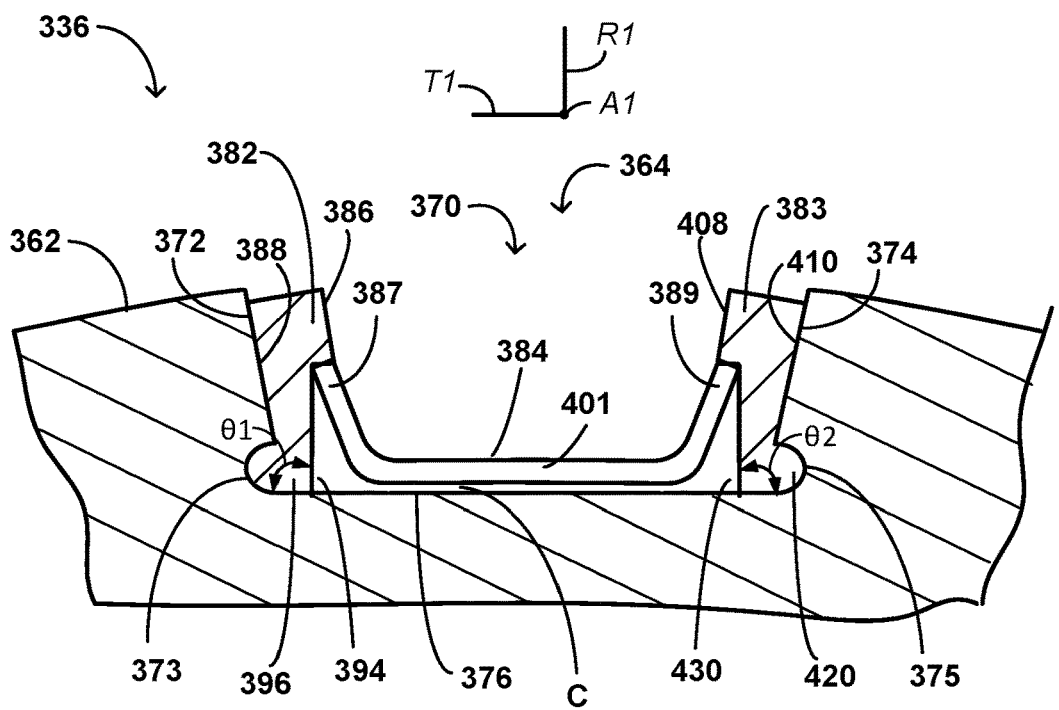
FIG. 10 is another cross-section plan view of the example brake disc, the example first insert member, the example second insert member, and the example bridge member of FIG. 9.

FIG. 10 illustrates drive insert 370 with bridge member 384 positioned to extend between first insert member 382 and second insert member 383. Bridge member 384 is configured to secure first insert member 382 and second insert member 383 against substantial movement in the tangential direction T1, relative to rotor brake disc 336. In FIG. 10, member bridge first end 387 is inserted in first member bridge slot 394, and bridge second end 389 is inserted in second member bridge slot 430. Bridge member 384 (e.g., at bridge first end 387) contacts first insert member 382 (e.g., contacts first member bridge slot 394) such that a force on first insert member 382 in a direction toward second insert member 383 is transmitted to bridge member 384, causing bridge member 384 to exert a reaction force on first insert member 382 opposing substantial movement of first insert member 382 in response to the force. Bridge member 384 (e.g., at bridge second end 389) contacts second insert member 383 (e.g., contacts second member bridge slot 430) such that a force on second insert member 383 in a direction toward first insert member 382 is transmitted to bridge member 384, causing bridge member 384 to exert a reaction force on second insert member 383 opposing substantial movement of second insert member 383 in response to the force. Bridge first end 387 may abut first insert member 382 and/or bridge second end 389 may abut second insert member 383. In examples, bridge member 384 contacts and/or abuts both first insert member 382 and second insert member 383, such that a force from one of first insert member 382 or second insert member 383 may be transmitted through bridge member 384 to the other of first insert member 382 or second insert member 383.

Bridge member 384 may be in compression when located between first insert member 382 and second insert member 383, or may be in a substantially relaxed, zero-stress condition when located between first insert member 382 and second insert member 383. Bridge member 384 may experience some degree of deformation during placement between first insert member 382 and second insert member 383, or may be configured to substantially remain in its relaxed, zero-stress condition during placement between first insert member 382 and second insert member 383. Bridge member 384 may act to substantially establish and/or maintain the engagement of first member back face 388 with first torque face 372, and may act to substantially establish and/or maintain the engagement of second member back face 410 with second torque face 374. This may contribute to the stability of first insert member 382 and/or second insert member 383 during operations of wheel 210 and/or braking assembly 258 (FIG. 2). Bridge member 384 may act to establish and/or maintain first member insert lip 396 securely within recess 373 of drive slot 364, and may act to establish and/or maintain second member insert lip 420 securely within recess 375 of drive slot 364 during operations of wheel 210 and/or braking assembly 258 (FIG. 2).

In some examples, bridge member 384 is configured to extend between first insert member 382 and second insert member 383 in a manner which substantially avoids contact with rotor brake disc 336. This may prevent drive insert 370 from bottoming out and contacting rotor brake disc 336 (e.g., surface 376 (FIG. 4, 5, 9, 10)) during operations of wheel 210 and/or braking assembly 258 (FIG. 2). This may reduce or avoid radially oriented (e.g., in the radial direction R1) mechanical stresses imparted to drive slot 364 by rotor drive key 340, when rotor drive key 340 extends through drive slot 364. For example, FIG. 10 illustrates bridge member 384 extending between first insert member 382 and second insert member 383 in a manner which provide a clearance C between bridge member 384 (e.g., base section 401) and rotor brake disc 336 (e.g., surface 376 (FIG. 4, 5, 9, 10)). Bridge member 384 may be configured to at least establish the clearance C in order to minimize or avoid contact between rotor brake disc 336 and bridge member 384, in order to reduce or eliminate the transmission of mechanical stresses or vibrations from rotor drive key 340 to a portion of rotor brake disc 336. The clearance C may assist in mitigating and/or eliminating wear on portions of rotor brake disc 336 which might be contacted by bridge member 384. For example, the clearance C may assist in maintaining an anti-oxidation coating on rotor brake disc 336. In some examples, one or more surfaces defining bridge slot 394 and/or bridge slot 430 may be configured such that, when positioned, bridge member 384 tends to slide in the radial direction R1 within bridge slot 394, 430 to assist in maintaining clearance C. For example, one or more of the surfaces defining bridge slot 394 and/or bridge slot 430 may be angled such that a displacement from a plane including the line R1 and the line A1 increases in a direction parallel to the radial direction R1 (e.g., angle θ1 and/or angle θ2 may be less than 90 degrees). This may assist in maintaining the structural integrity of rotor brake disc 336 and/or drive slot 364 as repeated braking operations occur.

As discussed, bridge member 384 may be configured to be in compression when first insert member 382 is positioned over first disc surface 378, second insert member 383 is positioned over second disc surface 380, and bridge member 384 extends between first insert member 382 and second insert member 383. Bridge member 384 may be configured such that the compression establishes a contact pressure between first insert member 382 and first torque face 372, and establishes a contact pressure between second insert member 383 and second torque face 374. In examples, bridge member 384 is configured to be inserted between insert members 382, 383, such that when member first end 387 is engaged with first insert member 382 (e.g., inserted into first member bridge slot 394) and member second end 389 is engaged with second insert member 383 (e.g., inserted into second member bridge slot 430), bridge member 384 imparts a first force to first insert member 382 in a direction from drive face 386 to back face 388 and imparts a second force to second insert member 383 in a direction from the drive face 408 to back face 410 of second insert member 383. The first force may drive and/or more fully establish first member back face 388 into engagement with first torque face 372, and may establish a contact pressure between first member back face 388 and first torque face 372, when first insert member 382 is positioned over first disc surface 378 (FIGS. 4 and 5). The second force may drive and/or more fully establish second member back face 410 into engagement with second torque face 374, and may establish a contact pressure between second member back face 410 and second torque face 374 when second insert member 383 is positioned over second disc surface 380 (FIGS. 4 and 5).

In examples, bridge member 384 may be or may include a flat spring and/or a helical spring. Bridge member 384 may include a compression spring configured to generate more potential energy when compressed by a specific displacement than when extended by the specific displacement. Bridge member 384 may include a proportional spring, and may include a constant force spring.

Figure 11:
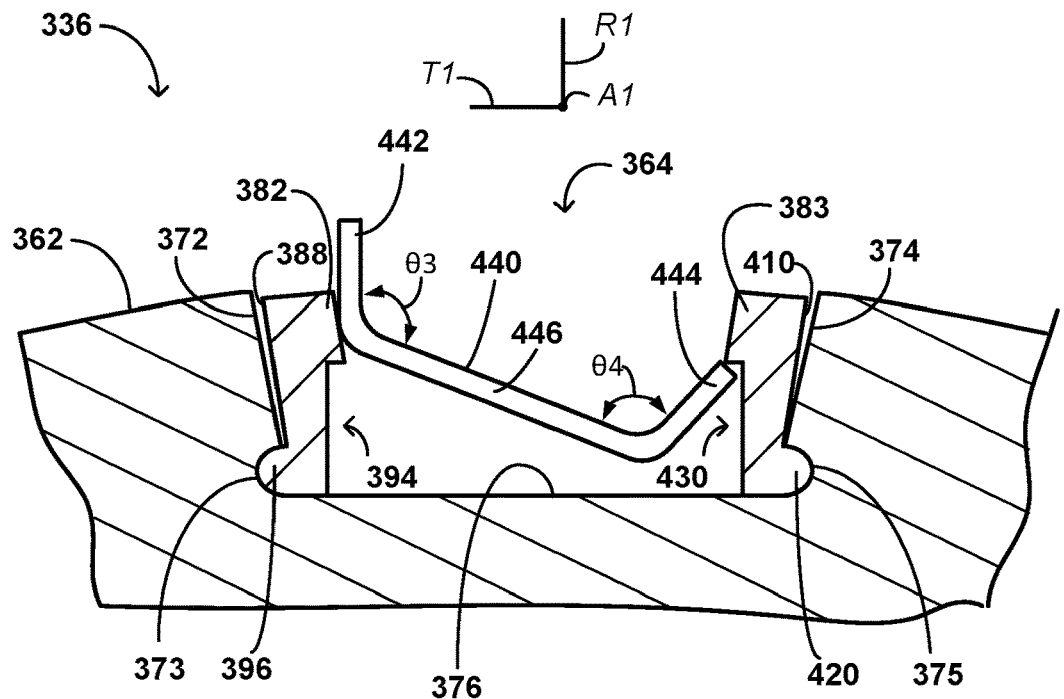
FIG. 11 is cross-section plan view of an example brake disc, an example first insert member, an example second insert member, and an example bridge member, where the cross-section is taken in a direction perpendicular to an axis of rotation of the brake disc.

For example, FIG. 11 illustrates bridge member 440 configured as a flat spring and including a first end 442 ("spring first end 442") configured to first member bridge slot 394 defined by first insert member 382, and includes a second end 444 ("spring second end 444") configured to insert into second member bridge slot 430 defined by second insert member 383. Bridge member 440 includes a spring base 446 between spring first end 442 and spring second end 444. Bridge member 440 is an example of bridge member 384, spring first end 442 is an example of member first end 387, spring second end 444 is an example of member second end 389, and spring base 446 is an example of base section 401.

Bridge member 440 is a substantially elastic member which exhibits a change in shape when a compressive force is applied to bridge member 440 (e.g., by first insert member 382 and/or second insert member 383), and which substantially reverses the change in shape when the compressive force is removed. As depicted in FIG. 11, spring second end 444 is partially inserted within second member bridge slot 430, with bridge member 440 in a relaxed, substantially zero-stress configuration. In the zero-stress configuration, spring first end 442 is oriented at an angle θ3 with spring base 446 and spring second end 444 is oriented at an angle θ4 with spring base 446.

Figure 12:
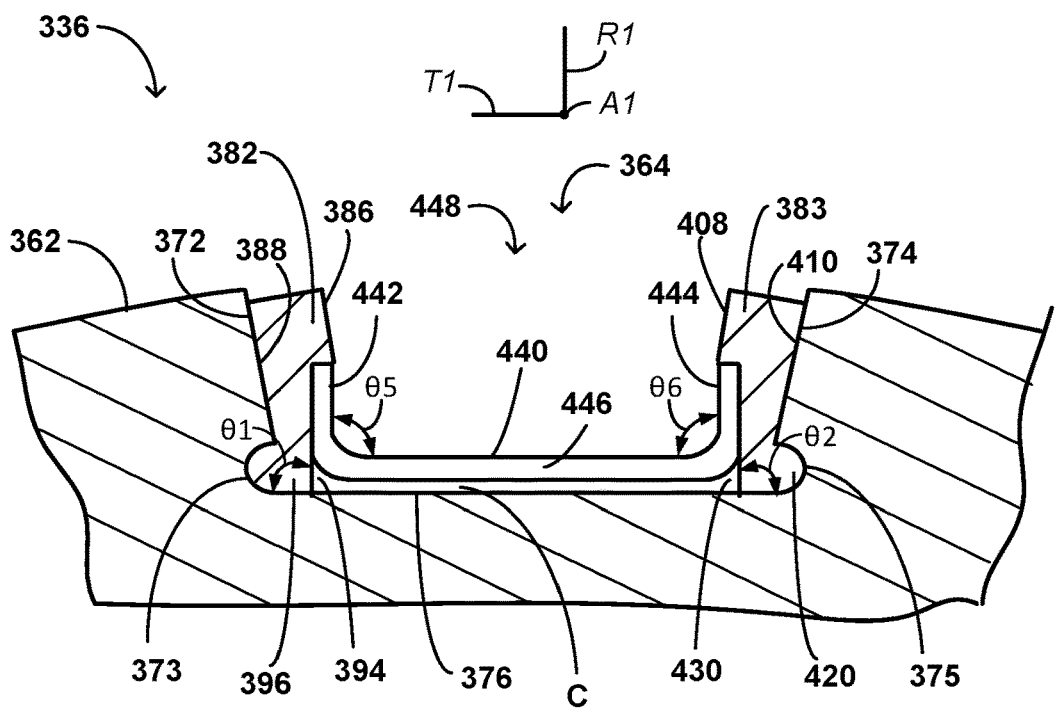
FIG. 12 is another cross-section plan view of the example brake disc, the example first insert member, the example second insert member, and the example bridge member of FIG. 11.

FIG. 12 illustrates drive insert 448 with bridge member 440 positioned to extend between first insert member 382 and second insert member 383. Drive insert 448 is an example of drive insert 370. Bridge member 440 is configured to secure first insert member 382 and second insert member 383 against substantial movement in the tangential direction T1, relative to rotor brake disc 336. In FIG. 12, spring first end 442 is inserted in first member bridge slot 394, and spring second end 444 is inserted in second member bridge slot 430. Bridge member 440 is in compression, with spring first end 442 applying a spring force to first insert member 382 in a direction from spring first end 442 to first member back face 388, and spring second end 444 applying a spring force to second insert member 383 in a direction from spring second end 444 to second member back face 410. In the compressed configuration, spring first end 442 is oriented at an angle θ5 with spring base 446 and spring second end 444 is oriented at an angle θ6 with spring base 446. With bridge member 440 in the compressed condition, angle θ5 may be less than angle θ3, and angle θ6 may be less than angle θ4.

The spring force imparted by bridge member 440 to first insert member 382 may drive and/or more fully establish first member back face 388 into engagement with first torque face 372, and may establish a contact pressure between first member back face 388 and first torque face 372. The spring force imparted by bridge member 440 to second insert member 383 may drive and/or more fully establish second member back face 410 into engagement with second torque face 374, and may establish a contact pressure between second member back face 410 and second torque face 374. These contact pressures may contribute to the stability of first insert member 382 and/or second insert member 383 during operations of wheel 210 and/or braking assembly 258 (FIG. 2). For example, the increased engagement of first member back face 388 and first torque face 372, and/or second member back face 410 and second torque face 374, may increase the respective contact areas and promote a more uniform force transmission through first insert member 382 and/or second insert member 383 when rotor brake disc 336 transmits braking forces to rotor drive key 340. The respective spring forces may act to establish and/or maintain first member insert lip 396 securely within recess 373 of drive slot 364, and may act to establish and/or maintain second member insert lip 420 securely within recess 375 of drive slot 364 during operations of wheel 210 and/or braking assembly 258 (FIG. 2).

Bridge member 440 may be configured to extend between first insert member 382 and second insert member 383 in a manner providing the clearance C between bridge member 440 and rotor brake disc 336, in order to minimize or avoid contact between rotor brake disc 336 and bridge member 440. In some examples, one or more surfaces defining bridge slot 394 and/or bridge slot 430 are configured such that, when positioned, bridge member 440 may slide (e.g., may tend to slide) in the radial direction R1 within bridge slot 394, 430 to assist in maintaining clearance C.

Figure 13:
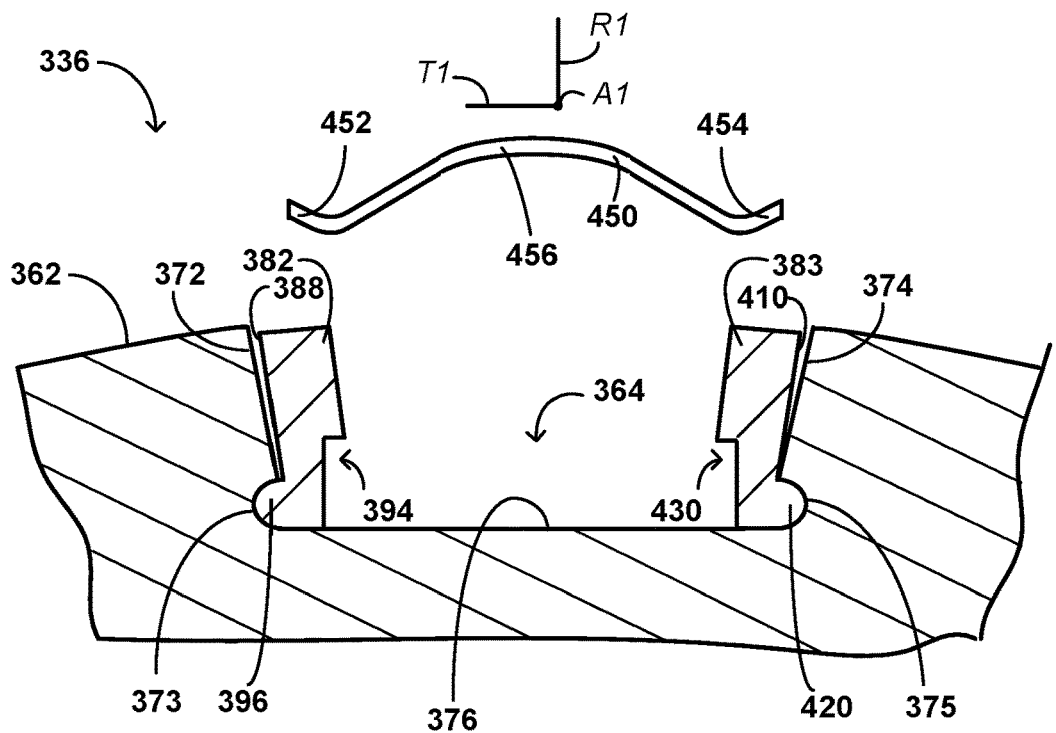
FIG. 13 is cross-section plan view of an example brake disc, an example first insert member, an example second insert member, and an example bridge member, where the cross-section is taken in a direction perpendicular to an axis of rotation of the brake disc.

In some examples, bridge member 384 may be or may include a substantially plastically deforming member configured to plastically deform when placed between first insert member 382 and second insert member 383. For example, FIG. 13 illustrates bridge member 450 including a first end 452 ("member first end 452"), a second end 454 ("member second end 545"), and a base section 456 between member first end 452 and member second end 454. Bridge member 450 is an example of bridge member 384, member first end 452 is an example of bridge first end of member first end 387, member second end 454 is an example of member second end 389, and base section 456 is an example of base section 401.

Bridge member 450 is a substantially plastically deforming member configured to retain some degree of elasticity when plastically deformed, such that when bridge member 450 is compressed between first insert member 382 and second insert member 383, the retained elasticity of bridge member 450 causes member first end 452 to push back against first insert member 382 and/or member second end 454 to push back against second insert member 383. In some examples, bridge member 450 exhibits a substantially irreversible change in shape when an installation force (e.g., a compressive force) is applied to bridge member 450 (e.g., by first insert member 382, second insert member 383, an installing operator, or some other source).

Bridge member 450 may be configured to assume a relaxed configuration ("at rest" configuration) when bridge member 450 is in a relaxed, substantially zero-stress condition, e.g., not compressed between first and second insert members 382, 383. In some examples, bridge member 450 assumes the relaxed condition in the absence of externally generated forces on member first end 452, member second end 454, and/or base section 456. For example, FIG. 13 illustrates bridge member 450 in a relaxed configuration generally having a U-shape with member first end 452 and member second end 454 displaced from a portion of base section 456 in a substantially similar direction (e.g., in a direction R1). In the relaxed configuration depicted, bridge member 450 is in a substantially zero-stress position, where any stresses on bridge member 450 arise from properties or phenomena internal to bridge member 450, such as mass, internal temperature, residual stresses, and the like. Although bridge member 450 is depicted having the general U-shape, bridge member 450 may be configured to assume any other suitable shape in the relaxed configuration. Bridge member 450 is configured to plastically deform in response to an externally applied force (e.g., applied by an operator) which acts to place bridge member 450 in contact with first insert member 382 and second insert member 383.

Figure 14:
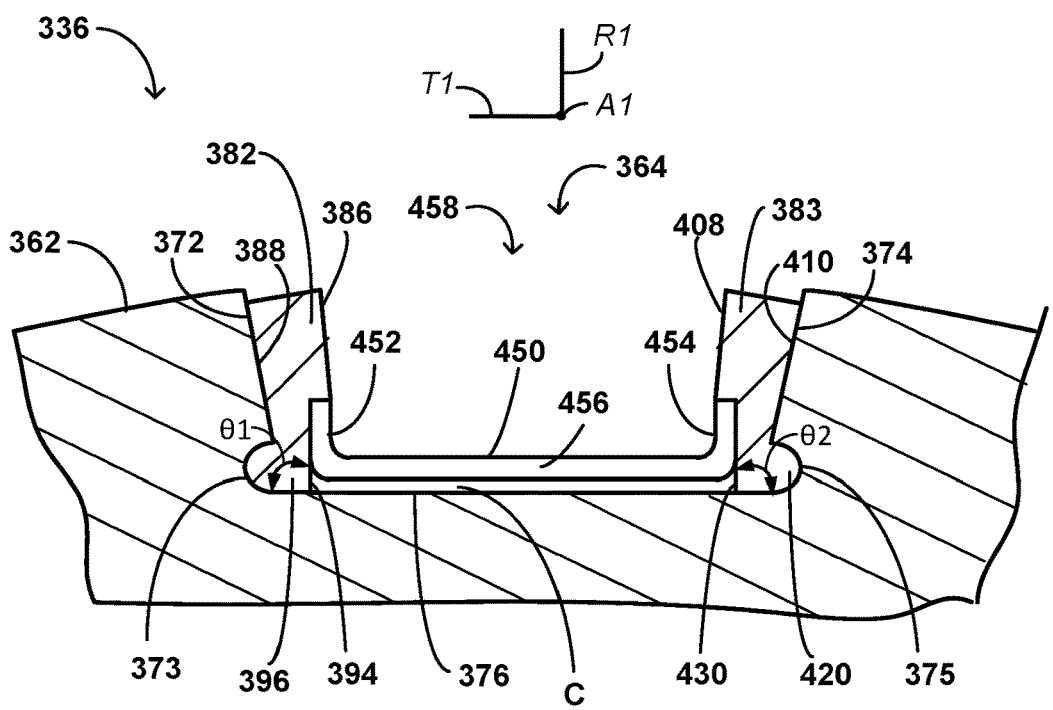
FIG. 14 is another cross-section plan view of the example brake disc, the example first insert member, the example second insert member, and the example bridge member of FIG. 13.

FIG. 14 illustrates drive insert 458 with bridge member 450 positioned to extend between first insert member 382 and second insert member 383. Drive insert 458 is an example of drive insert 370. Within drive insert 458, bridge member 450 is plastically deformed and in contact with first insert member 382 and second insert member 383, such that bridge member 450 secures first insert member 382 and second insert member 383 against substantial movement in the tangential direction T1, relative to rotor brake disc 336. In FIG. 14, member first end 452 is inserted in first member bridge slot 394, and member second end 454 is inserted in second member bridge slot 430. Bridge member 450 is configured to retain some degree of elasticity when plastically deformed. In examples, bridge member 450 may be in compression between first insert member 382 and second insert member 383. In the plastically deformed configuration illustrated in FIG. 14, member first end 452 exerts a first force to first insert member 382 in a direction from member first end 452 to first member back face 388, and member second end 454 exerts a second force to second insert member 383 in a direction from member second end 454 to second member back face 410.

The first force imparted by bridge member 450 to first insert member 382 may drive and/or more fully establish first member back face 388 into engagement with first torque face 372, and may establish a contact pressure between first member back face 388 and first torque face 372. The second force imparted by bridge member 450 to second insert member 383 may drive and/or more fully establish second member back face 410 into engagement with second torque face 374, and may establish a contact pressure between second member back face 410 and second torque face 374. The contact pressures may contribute to the stability of first insert member 382 and/or second insert member 383 during operations of wheel 210 and/or braking assembly 258 (FIG. 2), for example by increasing the engagement of first member back face 388 and first torque face 372, and/or second member back face 410 and second torque face 374. The first force and the second force may act to establish and/or maintain first member insert lip 396 securely within recess 373 of drive slot 364, and may act to establish and/or maintain second member insert lip 420 securely within recess 375 of drive slot 364 during operations of wheel 210 and/or braking assembly 258 (FIG. 2).

Bridge member 450 may be configured to extend between first insert member 382 and second insert member 383 in a manner providing the clearance C between bridge member 450 and rotor brake disc 336, in order to minimize or avoid contact between rotor brake disc 336 and bridge member 450. In some examples, one or more surfaces defining bridge slot 394 and/or bridge slot 430 are configured such that, when positioned, Bridge member 450 may slide (e.g., may tend to slide) in the radial direction R1 within bridge slot 394, 430 to assist in maintaining clearance C.

Figure 15:
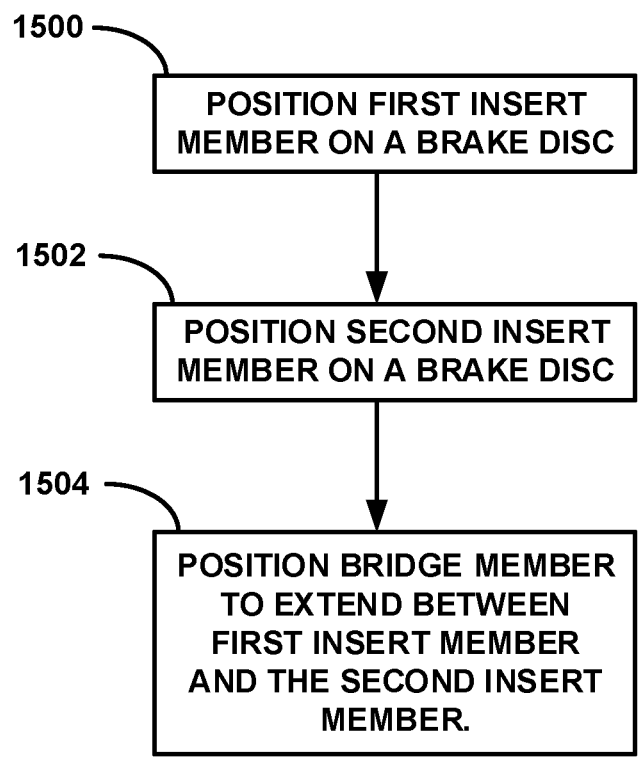
FIG. 15 is a flow diagram illustrating an example technique of installing a drive insert including a first insert member, a second insert member, and a bridge member.

FIG. 15 illustrates a flow diagram of an example technique for positioning a drive insert on a drive slot of a brake disc. Although the technique is described with reference to drive insert 370 and rotor brake disc 336 of FIGS. 3-10, in other examples, the technique may be used with another drive insert and brake disc.

The technique includes positioning first insert member 382 on rotor brake disc 336 over first disc surface 378 (1500). For example, a user, alone or with the aid of a tool, or a machine can slidably translate first insert member 382 over first disc surface 378 and/or some portion of rotor brake disc 336 to position first insert member 382 over first disc surface 378. First insert member 382 may be slidably translated over first disc surface 378 and/or some portion of rotor brake disc 336 in a direction substantially tangential to rotor brake disc 336. The user or machine can engage (e.g., contacting or frictionally engaging) first member back face 388 and first torque face 372 of rotor brake disc 336 when first insert member 382 is positioned over first disc surface 378.

In some examples in which first insert member 382 includes a first tab 390 including a first insert surface 391 and a second tab 392 including a second insert surface 393, first insert surface 391 may face first disc surface 378 when first insert member 382 is positioned over first disc surface 378 and second insert surface 393 may face third disc surface 379 when first insert member 382 is positioned over first disc surface 378.

As discussed with reference to FIGS. 7A-7D, first insert member 382 may define a space 395 between first insert surface 391 and second insert surface 393. In some examples, positioning first insert member 382 on rotor brake disc 336 (1500) includes positioning first insert member 382 over rotor brake disc 336 such that a portion of rotor brake disc 336 adjacent to drive slot 364 is introduced into the space 395. In this way, first insert member 382 brackets (e.g., at least partially surrounds) the portion of rotor brake disc 336. In examples in which back face 388 of first insert member 382 includes a mating protrusion, positioning first insert member 382 on rotor brake disc 336 (1500) may include inserting the mating protrusion into a mating recess of rotor brake disc 336. In examples in which back face 388 includes a mating recess configured to receive a mating protrusion of rotor brake disc 336, positioning first insert member 382 on rotor brake disc 336 (1500) may include placing first insert member 382 over brake disc 336 such that the mating protrusion of rotor brake disc 336 is inserted into the mating recess of first insert member 382.

In examples in which first insert member 382 includes insert lip 396, positioning first insert member 382 on brake disc 336 (1500) includes inserting insert lip 396 into a recess 373 of rotor brake disc 336. Insert lip 396 may include lip bearing surface 397, and the technique may include inserting insert lip 396 such that lip bearing surface 397 faces recess bearing surface 371. Inserting insert lip 396 in recess 373 may include engaging (e.g., contacting or frictionally engaging) lip bearing surface 397 and recess bearing surface 371, which may help secure first insert member 382 against motion relative to rotor brake disc 336 in a radial direction of rotor brake disc 336 when insert lip 396 inserts into recess 373.

In accordance with the technique shown in FIG. 15, the user or machine positions second insert member 383 on rotor brake disc 336 over second disc surface 380 (1502). For example, second insert member 383 may be slidably translated over second disc surface 380 and/or some portion of rotor brake disc 336 to position second insert member 383 over second disc surface 380. Second insert member 383 may be slidably translated over second disc surface 380 and/or some portion of rotor brake disc 336 in a direction substantially tangential to rotor brake disc 336. The sliding translation of second insert member 383 may be in a substantially tangential direction opposite the sliding translation of first insert member 382. The technique may include engaging (e.g., contacting or frictionally engaging) second member back face 410 and second torque face 374 of rotor brake disc 336 when second insert member 383 is positioned over second disc surface 380.

Second insert member 383 may be configured similarly to first insert member 382 in some examples, and, thus, any of the techniques described above for positioning first insert member 382 over brake disc 336 (1500) may be similarly used to position second insert member 383 over brake disc 336 (1502). For example, second insert member 383 may include a first tab 412 ("second member first tab 412") and a second tab 416 ("second member second tab 416"), and second insert member 383 can be positioned such that at least a portion of brake disc 336 is received within a space between second member first tab 412 and second member second tab 416. Thus, in some examples, after second insert member 383 is positioned on brake disc 336 (1502), second insert member 383 brackets (e.g., at least partially surrounds) a portion of rotor brake disc 336. As another example, in examples in which second insert member 383 includes second member insert lip 420, positioning second insert member 383 on brake disc 336 includes inserting second member insert lip 420 into a corresponding recess 375 defined by rotor brake disc 336.

The technique shown in FIG. 15 further includes positioning bridge member 384, 440, 450 to extend from first insert member 382 to second insert member 383 (1504). A user or machine can position bridge member 384, 440, 450 (1504) by at least placing bridge member 384, 440, 450 in between first insert member 382 and second insert member 383. In examples, positioning bridge member 384, 440 includes substantially elastically deforming bridge member 384, 440 to apply a spring force from first end 387, 442 to first insert drive face 386 and apply a spring force from second end 389, 444 to second insert drive face 408. In examples, positioning bridge member 384, 450 includes substantially plastically deforming bridge member 384, 450 to apply a spring force from first end 387, 452 to first insert drive face 386 and/or apply a spring force from second end 389, 454 to second insert drive face 408. In some examples, positioning bridge member 384, 450 includes substantially plastically deforming bridge member 384, 450 to minimize a clearance between bridge member 384, 450 and first insert member 382 (e.g., first insert drive face 386) and/or second insert member 384 (e.g., second insert drive face 408). As discussed above, bridge member 384, 440, 450 helps to secure first insert member 382 and second insert member 383 against motion relative to rotor brake disc 336 in a tangential direction of rotor brake disc 336 when bridge member 384, 440, 450 is positioned between first insert member 382 and second insert member 383.

For example, a spring force applied by bridge member 384, 440, 450 to insert members 382, 383 may establish or increase contact between first member back face 388 and first torque face 372 of rotor brake disc 336 and may establish or increase contact between second member back face 410 and second torque face 374. The first force and the second force applied by bridge member 384, 440, 450 to insert members 382, 383 may establish or increase contact between first member back face 388 and first torque face 372 of rotor brake disc 336 and may establish or increase contact between second member back face 410 and second torque face 374.

In some examples, positioning bridge member 384, 440, 450 (1504) includes inserting an end of bridge member 384, 440, 540 into a bridge slot (e.g., inserting second end 389, 444, 454 into second member bridge slot 430 (FIG. 9, 11)) and applying a force having a component parallel to the radial direction R1 onto some portion of bridge member 384, 444, 454, such that bridge member 384, 444, 454 compresses and an opposite end inserts into the remaining bridge slot (e.g., first end 387, 442, 452 inserts into first member bridge slot 394 (FIG. 10, 12, 14)).

In some examples, positioning bridge member 384, 440 (1504) includes inserting an end of bridge member 384, 440 into a bridge slot (e.g., inserting second end 389, 444 into second member bridge slot 430 (FIG. 9, 11)) and applying a force having a component parallel to the radial direction R1 onto some portion of bridge member 384, 444, such that bridge member 384, 444 elastically compresses tangentially until the opposite end inserts into the remaining bridge slot (e.g., first end 387, 442 inserts into first member bridge slot 394 (FIG. 10, 12).

In some examples, positioning bridge member 384, 440, 450 (1504) includes contacting first end 387, 442, 452 with first member drive face 386, and contacting second end 389, 444, 454 with second member drive face 408. For example, a user or machine can at least partially insert first end 387, 442, 452 into first member bridge slot 394, and at least partially insert second end 389, 444, 454 into second member bridge slot 430. As discussed above with reference to FIG. 10, FIG. 12, and FIG. 14, in some examples, when bridge member 384, 440, 540 is positioned between inserts 382, 383, there is a clearance C between bridge member 384, 440, 450 and rotor brake disc 336.

In some examples, positioning bridge member 450 (1504) includes contacting first end 452 with disk surface 376, and contacting second end 454 with disk surface 376. For example, a user or machine can at least partially insert first end 452 into first member bridge slot 394, and at least partially insert second end 454 into second member bridge slot 430. Then an installation force is applied to the bridge center section 456, in a direction downward and parallel to R1, to cause plastic deformation of the bridge center section 456 which will result in the bridge ends 452 and 454 to expanding tangentially into the first and second insert member slots, 394 and 430.

Various examples have been described. These and other examples are within the scope of the following claims.

What is claimed is:

1. An apparatus comprising:
a first insert member configured to be positioned over a first surface of a brake disc, wherein the first surface is adjacent to a drive slot on a perimeter of the brake disc, wherein the first insert member is configured to be slidable over the first surface in a first direction substantially tangential to the brake disc, and wherein the first insert member comprises a drive face defining a slot and a back face opposite the drive face, and wherein the back face is configured to engage a torque face of the brake disc when the first insert member is positioned over the first surface;
a second insert member configured to be positioned over a second surface of the brake disc, wherein the second surface is adjacent to the drive slot on the perimeter of the brake disc, wherein the second insert member is configured to be slidable over the second surface in a second direction substantially opposite the first direction; and a bridge member configured to extend from the first insert member to the second insert member when the first insert member is positioned over the first surface and the second insert member is positioned over the second surface, wherein the bridge member is configured to limit movement of the first insert member and the second insert member in a tangential direction of the brake disc when the bridge member extends from the first insert member to the second insert member, and wherein a first end of the bridge member is configured to insert into the slot when the back face engages the torque face.

2. The apparatus of claim 1, wherein the first insert member comprises an insert lip configured to insert into a recess of the brake disc when the first insert member is positioned over the first surface.

3. The apparatus of claim 2, wherein
the first end of the bridge member is configured to insert into the slot when the insert lip is inserted into the recess of the brake disc.

4. The apparatus of claim 3, wherein the first insert member comprises:
a body section defining the drive face and the back face;
a first tab extending from the body section; and
a second tab extending from the body section,
wherein the first tab and the second tab are configured to limit movement of the first insert member in an axial direction of the brake disc when the back face engages the torque face,
wherein the insert lip of the first insert member is configured to limit movement of the first insert member in a radial direction of the brake disc when the back face of the first insert member engages the torque face, and
wherein the bridge member is configured to limit movement of the first insert member in the tangential direction of the brake disc when the back face of the first insert member engages the torque face and the first end of the bridge member inserts into the slot.

5. The apparatus of claim 1, wherein the first insert member further comprises:
a body section defining the drive face and the back face;
a first tab extending from the body section; and
a second tab extending from the body section.

6. The apparatus of claim 5, wherein the first tab is configured to engage the first surface when the back face engages the torque face of the brake disc, and wherein the second tab is configured to engage a third surface of the brake disc opposite the first surface when the back face engages the torque face.

7. The apparatus of claim 1, wherein the bridge member is configured to establish a clearance between the bridge member and a support surface of the drive slot when the bridge member extends from the first insert member to the second insert member.

8. The apparatus of claim 1, wherein the bridge member includes a spring having a first end and a second end, wherein the first end is configured to contact the first insert member and the second end is configured to contact the second insert member when the spring extends from the first insert member to the second insert member.

9. The apparatus of claim 1, wherein the bridge member is configured to plastically deform when the bridge member extends from the first insert member to the second insert member.

10. The apparatus of claim 1, wherein the bridge member is configured to be in compression when the first insert member is positioned over the first surface, the second insert member is positioned over the second surface, and the bridge member extends from the first insert member to the second insert member.

11. The apparatus of claim 1, wherein the slot comprises a first slot, and wherein the second insert member defines a second slot configured to receive the bridge member when the bridge member extends from the first insert member to the second insert member.

12. A system comprising:
the brake disc; and
the apparatus of claim 1.

13. The apparatus of claim 1,
wherein the drive face is a first drive face, the back face is a first back face, the first slot is a first slot, and the torque face of the brake disc is a first torque face,
wherein the second insert member comprises a second drive face defining a second slot and a second back face opposite the second drive face, and wherein the second back face is configured to engage a second torque face of the brake disc when the second insert member is positioned over the second surface, and
wherein a second end of the bridge member opposite the first end is configured to insert into the second slot when the second back face engages the second torque face.

14. An assembly comprising:
a brake disc defining:
a drive slot extending axially through the brake disc on a perimeter of the brake disc;
a first surface adjacent to the drive slot; and
a second surface adjacent to the drive slot;
a first insert member, the first insert member comprising:
a first body section defining a first slot; and
a first body tab extending from the first body section, wherein the first body tab is configured to be positioned over the first surface of the brake disc;
a second insert member, the second insert member comprising:
a second body section defining a second slot; and
a second body tab extending from the second body section, wherein the second body tab is configured to be positioned over the second surface of the brake disc; and
a bridge member configured to extend from the first insert member to the second insert member,
wherein the bridge member has a first end and a second end, and
wherein the first end is configured to insert into the first slot and the second end is configured to insert into the second slot when the first body tab is positioned over the first surface, the second body tab is positioned over the second surface, and the bridge member extends from the first insert member to the second insert member.

15. The assembly of claim 14, wherein:
the brake disc comprises a first torque face adjacent to the first surface,
the brake disc comprises a second torque face adjacent to the second surface,
the first body section comprises a first back face configured to engage the first torque face when the first body tab is positioned over the first surface and the bridge member extends from the first insert member to the second insert member, and
the second body section comprises a second back face configured to engage the second torque face when the second body tab is positioned over the second surface and the bridge member extends from the first insert member to the second insert member.

16. The assembly of claim 14, wherein the first body tab comprises a first body first tab, the first body section further comprising a first body second tab extending from the first body section, wherein the first body first tab and the first body second tab define a space configured to receive the brake disc, and wherein the second body tab comprises a second body first tab, the second body further comprising a second body second tab extending from the second body section, wherein the second body first tab and the second body second tab define a space configured to receive the brake disc.

17. The assembly of claim 14 wherein:

the first insert member comprises a first insert lip configured to insert into a first recess of the brake disc when the first body tab is positioned over the first surface and the bridge member extends from the first insert member to the second insert member; and the second insert member comprises a second insert lip configured to insert into a second recess of the brake disc when the second body tab is positioned over the second surface and the bridge member extends from the first insert member to the second insert member.

18. A method comprising:

positioning a first insert member on a brake disc by at least sliding the first insert member in a tangential direction of the brake disc over a first surface, wherein the first surface is adjacent to a drive slot extending axially through a perimeter of the brake disc, wherein the first insert member comprises a drive face defining a slot and a back face opposite the drive face, and wherein the back face is configured to engage a torque face of the brake disc when the first insert member is positioned on the brake disc;

positioning a second insert member on a brake disc by at least sliding the second insert member in the tangential direction of the brake disc over a second surface, wherein the second surface is adjacent to the drive slot; and positioning a bridge member between the first and second insert members by at least inserting a first end of the bridge member into the slot when the first insert member is positioned over the first surface and the second insert member is positioned over the second surface, wherein the bridge member is configured to limit movement of the first insert member and the second insert member in the tangential direction of the brake disc when the bridge member extends from the first insert member to the second insert member.

19. The method of claim 18, wherein positioning the first insert member on the brake disc comprises inserting an insert lip of the first insert member into a first recess of the brake disc.

20. The method of claim 19, wherein positioning the first insert member on the brake disc comprises covering a portion of the torque face of the drive slot with a body section of the first insert member by at least sliding a first tab of the first insert member over the first surface, wherein the first torque face is adjacent to the first surface.

* * * * *